United States Patent
Ito et al.

(10) Patent No.: US 11,440,004 B2
(45) Date of Patent: Sep. 13, 2022

(54) MICROPARTICLE SORTING MICROCHIP AND MICROPARTICLE SORTING APPARATUS

(71) Applicant: Sony Corporation, Tokyo (JP)

(72) Inventors: Tatsumi Ito, Kanagawa (JP); Kazuya Takahashi, Saitama (JP); Masahiro Matsumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 47 days.

(21) Appl. No.: 16/762,295

(22) PCT Filed: Nov. 9, 2018

(86) PCT No.: PCT/JP2018/041608
§ 371 (c)(1),
(2) Date: May 7, 2020

(87) PCT Pub. No.: WO2019/098126
PCT Pub. Date: May 23, 2019

(65) Prior Publication Data
US 2021/0170402 A1    Jun. 10, 2021

(30) Foreign Application Priority Data

Nov. 14, 2017   (JP) .............................. JP2017-218941

(51) Int. Cl.
*B01L 3/00*       (2006.01)
*G01N 15/14*      (2006.01)
(Continued)

(52) U.S. Cl.
CPC ..... *B01L 3/502715* (2013.01); *B01L 3/50273* (2013.01); *B01L 3/502761* (2013.01);
(Continued)

(58) Field of Classification Search
CPC ..... B01L 2200/0636; B01L 2200/0652; B01L 2200/0668; B01L 2300/0627;
(Continued)

(56) References Cited

U.S. PATENT DOCUMENTS

2012/0288920 A1    11/2012  Takeda
2014/0027356 A1*    1/2014  Ito ..................... B07C 5/3416
                                                      209/577
(Continued)

FOREIGN PATENT DOCUMENTS

CN       107297334 A    10/2017
EP         1677094 A     7/2006
(Continued)

OTHER PUBLICATIONS

International Search Report and English translation thereof dated Feb. 5, 2019 in connection with International Application No. PCT/JP2018/041608.
(Continued)

*Primary Examiner* — Lyle Alexander
*Assistant Examiner* — Jonathan Bortoli
(74) *Attorney, Agent, or Firm* — Wolf, Greenfield & Sacks, P.C.

(57) ABSTRACT

A microparticle sorting microchip for a flow cytometer is provided to enable sorting of microparticles at higher speed, higher purity, and higher acquisition rate. The microparticle sorting microchip includes a main channel through which a microparticle-containing fluid flows, a trap channel coaxially communicating with the main channel, a trap chamber communicating with the trap channel, and a gate channel intersecting the trap channel. The trap channel has an opening intersecting the gate channel. The trap channel has a smaller cross-sectional area upstream of the opening than (Continued)

downstream of the opening along a direction in which the microparticle-containing fluid flows.

37 Claims, 11 Drawing Sheets

(51) Int. Cl.
*G01N 15/00* (2006.01)
*G01N 15/10* (2006.01)

(52) U.S. Cl.
CPC .... *B01L 3/502776* (2013.01); *G01N 15/1459* (2013.01); *B01L 2200/0636* (2013.01); *B01L 2200/0652* (2013.01); *B01L 2200/0668* (2013.01); *B01L 2300/0627* (2013.01); *B01L 2300/0816* (2013.01); *B01L 2300/0864* (2013.01); *B01L 2300/14* (2013.01); *B01L 2400/0439* (2013.01); *B01L 2400/0487* (2013.01); *G01N 2015/0053* (2013.01); *G01N 2015/1006* (2013.01); *G01N 2015/149* (2013.01)

(58) Field of Classification Search
CPC ..... B01L 2300/0816; B01L 2300/0864; B01L 2300/14; B01L 2400/0439; B01L 2400/0487; B01L 3/502715; B01L 3/50273; B01L 3/502761; B01L 3/502776; G01N 15/1459; G01N 15/1484; G01N 2015/0053; G01N 2015/1006; G01N 2015/149
See application file for complete search history.

(56) References Cited

U.S. PATENT DOCUMENTS

| 2014/0048458 | A1 | 2/2014 | Ito |
| 2015/0024373 | A1* | 1/2015 | Xia ................ B01L 3/502715 435/2 |
| 2015/0204774 | A1 | 7/2015 | Ito |
| 2016/0139026 | A1 | 5/2016 | Takeda |
| 2017/0320104 | A1 | 11/2017 | Ito |

FOREIGN PATENT DOCUMENTS

| EP | 2525209 A1 | 11/2012 |
| EP | 2876427 A1 | 5/2015 |
| JP | 1-170853 A | 7/1989 |
| JP | 2011-179945 A | 9/2011 |
| JP | 2014-036604 A | 2/2014 |
| JP | 2017-058735 A | 3/2017 |
| WO | WO 2011/086990 A1 | 7/2011 |
| WO | WO 2014/013802 A1 | 1/2014 |

OTHER PUBLICATIONS

Written Opinion and English translation thereof dated Feb. 5, 2019 in connection with International Application No. PCT/JP2018/041608.

International Preliminary Report on Patentability and English translation thereof dated May 28, 2020 in connection with International Application No. PCT/JP2018/041608.

* cited by examiner

A

B

A

B

US 11,440,004 B2

MICROPARTICLE SORTING MICROCHIP AND MICROPARTICLE SORTING APPARATUS

CROSS REFERENCE TO RELATED APPLICATIONS

This is a U.S. National Stage Application under 35 U.S.C. §371, based on International Application No. PCT/JP2018/041608, filed Nov. 9, 2018, which claims priority to Japanese Patent Application JP 2017-218941, filed Nov. 14, 2017, each of which is hereby incorporated by reference in its entirety.

TECHNICAL FIELD

The present invention relates to a microparticle sorting microchip and a microparticle sorting apparatus.

BACKGROUND ART

In the past, a variety of microparticle sorting microchips have been developed for flow cytometers.

For example, PTL 1 discloses a microchip for a flow cytometer which includes a channel structure disposed therein. This channel structure suppresses a spiral flow field generated after merging of a laminar flow of a sample fluid and a laminar flow of a sheath fluid, thereby avoiding turbulence in the laminar flow of the sample fluid.

Specifically, the microchip adopts a structure including a first introduction channel, second introduction channels arranged with the first introduction channel flanked therebetween and merging laterally the first introduction channel, and a merge channel communicating with the first and second introduction channels so that fluids fed from these channels merge and flow. The merge channel includes a tapered portion formed so that, in a direction of flanking of the first introduction channel by the second introduction channels, the merge channel has a channel width which gradually increases along a direction in which the fluids are fed.

Owing to the structure described above, the laminar flow of the sample fluid can be fed while being allowed to converge toward a center of the channel.

Further, PTL 2 discloses a microparticle sorting microchip that can stably extract only target microparticles at high speed from a sheath flow which is passing through a channel.

Specifically, this microparticle sorting microchip includes a main channel through which a microparticle-containing fluid flows, and a sorting channel which includes a sorting chamber and a pressure chamber arranged therealong and communicates with the main stream. The sorting chamber draws microparticles therein, and the pressure chamber generates a negative pressure. The sorting chamber is formed so that cross-sections vertical to flowing directions of the fluid in the sorting chamber and the pressure chamber are greater than a cross-section vertical to a flowing direction of the fluid in a remaining portion of the sorting channel.

CITATION LIST

Patent Literature

[PTL 1]
JP 2011-179945 A
[PTL 2]
JP 2017-058375 A

SUMMARY

Technical Problem

The present technology has as a primary object thereof the provision of a microparticle sorting microchip that enables sorting of microparticles at still higher speed, higher purity, and higher acquisition rate than the above-described microparticle sorting microchips.

Solution to Problem

To resolve the above-described problem, the present technology provides a microparticle sorting microchip including:

a main channel through which a microparticle-containing fluid flows;

a trap channel coaxially communicating with the main channel;

a trap chamber communicating with the trap channel; and a gate channel intersecting the trap channel, the trap channel having an opening intersecting the gate channel, the trap channel having a smaller cross-sectional area upstream of the opening than downstream of the opening along a direction in which the microparticle-containing fluid flows.

Preferably, the gate channel can include plural gate channels, and the plural gate channels can be connected to an upstream end of the downstream-stage trap channel so that the plural gate channels are symmetrical to each other with respect to a center of a flow of the microparticle-containing fluid from an opening at a downstream end of the upstream-stage trap channel.

The gate channel can preferably be configured to allow a gate flow fluid to always flow at a constant flow rate.

In the downstream-stage trap channel, the gate flow fluid can be branched to flow from the gate channel in a direction toward the upstream-stage trap channel and in a direction toward the pressure chamber.

The trap chamber can preferably be a pressure chamber.

The pressure chamber can have a vibration plate.

The pressure chamber can repeatedly be controlled in internal pressure to a negative pressure, a positive pressure, and a normal pressure.

The main channel can include a microparticle detection region.

Further, a connection channel can be included between the trap channel and the trap chamber.

The main channel can be connected with a microparticle-containing fluid inlet through which the microparticle-containing fluid is introduced.

The main channel can be connected with a sheath fluid inlet through which the sheath fluid is introduced.

The main channel can be connected with a branch channel which branches upstream of the trap channel and through which a portion of the microparticle-containing fluid which has not flowed into the trap channel is allowed to flow.

The branch channel can be connected with a sheath fluid container and/or a gate fluid container.

Downstream of the trap chamber, a microparticle collecting portion for collecting trapped microparticles can further be included.

When a microparticle has reached an upstream end of the upstream-stage trap channel, the pressure chamber can be changed in internal pressure from a normal pressure to a negative pressure, and the microparticle-containing fluid can be drawn into the upstream-stage trap channel and can be ejected from an opening at a downstream end of the upstream-stage trap channel into the downstream-stage trap channel to cause a jet flow (jet), and after the microparticle has passed through the downstream-stage trap channel and has reached the pressure chamber, the pressure chamber can be changed in internal pressure from the negative pressure or the normal pressure to a positive pressure.

Preferably, the microparticle-containing fluid has a volume that is at least a half of a volume of the upstream-stage trap channel.

Still further, when the pressure chamber has been changed in internal pressure from the normal pressure to the negative pressure, the microparticle-containing fluid can be ejected from the opening at the downstream end of the upstream-stage trap channel into the downstream-stage trap channel in a volume that is not greater than a volume in which a gate flow fluid flows from the gate channel into the downstream-stage trap channel.

Even still further, when the pressure chamber has been changed in internal pressure from the normal pressure to the negative pressure, the microparticle-containing fluid can be ejected from the downstream-stage trap channel in a direction toward the pressure chamber in a volume that is not greater than a volume of the downstream-stage trap channel.

Yet even still further, the present technology also provides a microparticle sorting apparatus including:

a microchip mounting portion configured to mount thereon a microparticle sorting microchip that includes a main channel through which a microparticle-containing fluid flows, a trap channel coaxially communicating with the main channel, a trap chamber communicating with the trap channel, and a gate channel intersecting the trap channel, the trap channel having an opening intersecting the gate channel the trap channel having a smaller cross-sectional area upstream of the opening than downstream of the opening along a direction in which the microparticle-containing fluid flows;

a light application section that applies light onto a microparticle detection region included in the main channel;

a detection section that detects scattered light and/or fluorescence emitted from the microparticle; and a pressure chamber control section that changes an internal pressure of a pressure chamber as the trap chamber to a negative pressure or a positive pressure.

In addition, the pressure chamber control section can have a piezo element.

Advantageous Effects of Invention

According to the present technology, it is possible to provide a novel microparticle sorting microchip for a flow cytometer and hence to enable sorting of microparticles at higher speed, higher purity, and higher acquisition rate.

It is to be noted that the above-described advantageous effects are not absolutely limiting and can be any advantageous effects described in the present disclosure.

DESCRIPTION OF EMBODIMENTS

Figure 1:
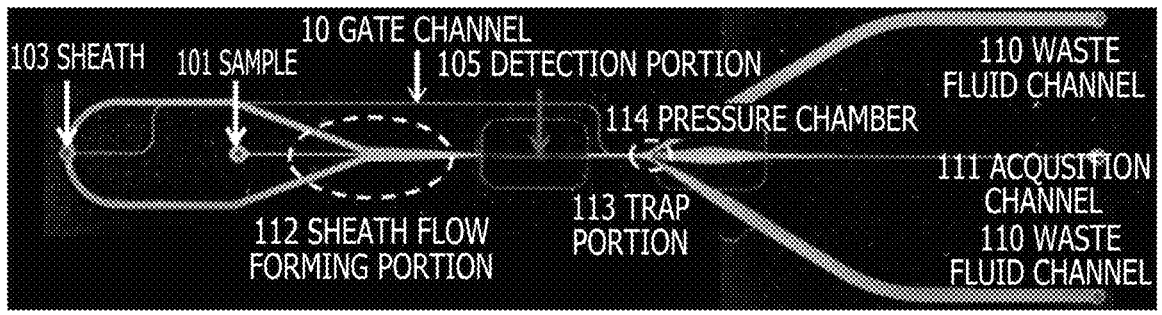
FIG. 1 is a diagram presenting an example of a basic structure of a microparticle sorting microchip.

A description will hereinafter be made regarding preferred embodiments for practicing the present technology.

It is to be noted that the embodiments which will hereinafter be described are representative examples of the present technology and the scope of the present technology shall not be interpreted narrowly by the embodiments.

The description will be made in the following order.
1. Basic Structure of Microparticle Sorting Microchip
   (1) Basic structure of microchip
   (2) Movements of microparticles in trap portion
   (3) Pressure control of pressure chamber
   (4) Back release of microparticles
   (5) Improvements in sorting performance of microparticles
   (6) Relationship between shape of trap channel and draw volume
2. Embodiment 1
3. Embodiment 2
4. Embodiment 3
5. Embodiment 4
6. Embodiment 5
7. Embodiment 6
8. Embodiment 7
9. Embodiment 8
10. Embodiment 9
11. Embodiment 10
12. Embodiment 11
13. Microparticle sorting apparatus
   (1) Configuration
   (2) Microparticle sorting program Here, "microparticles" can include biological microparticles such as cells, microorganisms, and liposomes, synthetic particles such as latex particles, gel particles, and industrial particles, and the like in the present technology.

The biological microparticles can include, for example, those which constitute various cells, such as chromosomes, liposomes, mitochondria, organelles (cell organelles), and the like.

The cells can include, for example, animal cells (hemocyte cells and the like) and plant cells.

The microorganisms can include, for example, bacteria such as *Escherichia coli*, viruses such as tobacco mosaic virus, and fungi such as yeast, and the like.

The biological microparticles can also include, for example, biological polymers such as nucleic acids, proteins, and complexes thereof.

Further, the synthetic particles can include particles made from organic or inorganic polymeric materials, metals, or the like. The organic polymeric materials can include, for example, polystyrene, styrene-divinylbenzene, polymethyl methacrylate, and the like. The inorganic polymeric materials can include, for example, glass, silica, magnetic materials, and the like. The metals can include, for example, gold colloid, aluminum, and the like.

The shape of microparticles can generally be spherical or substantially spherical, or non-spherical. The size and mass of microparticles can be determined selectively and appropriately by a person of ordinary skill in the art depending on the size of each channel in a microchip. On the other hand, the size of each channel in the microchip can also be determined selectively and appropriately depending on the size and mass of microparticles.

In the present technology, microparticles can be labeled with a chemical or biological marker, for example, a fluorescent dye or the like, as needed. The labeling can further facilitate detection of the microparticles. An appropriate marker can be selected by a person of ordinary skill in the art.

1. Basic Structure of Microparticle Sorting Microchip (1) Basic Structure of Microchip FIG. 1 presents an example of a basic structure of a microparticle sorting microchip.

In the microchip of FIG. 1, a microparticle-containing fluid is introduced from a microparticle-containing fluid inlet 101. In addition, a sheath fluid inlet 103 is also arranged and a sheath fluid is introduced form the sheath fluid inlet 103.

In a sheath flow forming portion 112, the sheath fluid merges with the microparticle-containing fluid and the microparticle-containing fluid (for example, merges with the microparticle-containing fluid from both sides of the microparticle-containing fluid) to form a laminar flow with the microparticle-containing fluid surrounded at its periphery by the sheath fluid or a laminar flow with the microparticle-containing fluid flanked by the sheath fluid, that is, what is generally called a sheath flow. The laminar flow flows toward a detection section 105.

At the detection section 105, for example, light is applied onto microparticles in the microparticle-containing fluid to detect the microparticles. On the basis of fluorescence and/or scattered light occurred by the application of the light, a determination is made as to whether the microparticles are those to be acquired. The detection section 105 can be a single spot, or plural spots. As an alternative, a plurality of laser beams can also be applied onto the single spot in the present technology.

A trap portion 113 is branched into plural numbers such as 2 or 3. In a case where the trap portion 113 is branched into three, the central branch channel is, for example, a trap channel and communicates to a trap chamber. In a case where the trap portion 113 is branched into two, on the other hand, the branch channels can be a disposal channel and a trap channel. The trap fluid is located at a position where the microparticle-containing fluid in the sheath flow reaches, and desirably has a cross-sectional shape large enough to allow the microparticle-containing fluid to enter in its entirety.

Each microparticle which has been determined at the detection section 105 to be acquired flows toward a branch portion branched in three in the trap portion 113, and upon reaching there, flows to the trap chamber configured to receive target microparticles. In the present technology, no particular limitation is imposed on the trap chamber insofar as it can receive target microparticles. Preferably, however, the trap chamber may be a pressure chamber. It is to be noted that in the present specification, description is made specifically assuming a trap chamber to be a pressure chamber. In such case, the internal pressure of a pressure chamber 114 is controlled at a negative pressure, whereby the microparticle is drawn into the pressure chamber 114 and flows into an acquisition channel 111.

The upper and lower branch channels are connected to a waste fluid channel 110, and the fluid which has flowed into the waste fluid channel 110 can be discharged to an outside of the microchip.

Figure 27:
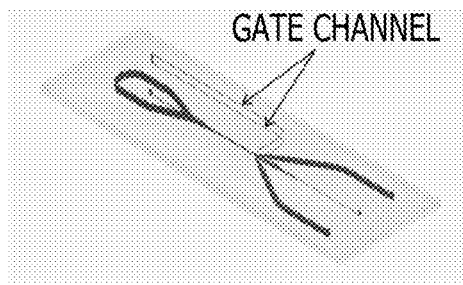
FIG. 27 depicts diagrams presenting a specific example of a symmetric connection of gate channels with respect to a channel center.
Figure 27:
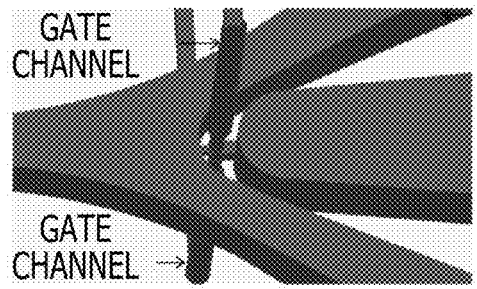
Figure 28:
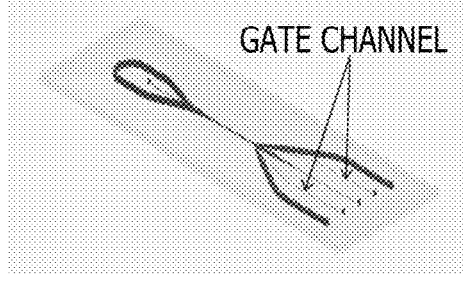
FIG. 28 depicts diagrams presenting another specific example of a symmetric connection of gate channels with respect to the channel center which is different from the specific example of FIG. 27.
Figure 28:
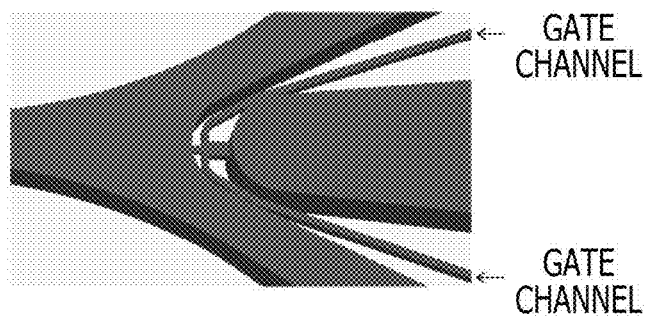

It is to be noted that the trap channel is provided with one or more channels, which are called "gate channel" or "gate channels" in the present specification, so that the one or more gate channels are connected to the trap channel or intersect the trap channel vertically, for example. FIGS. 27 and 28 are diagrams presenting specific examples of a symmetric connection of gate channels with respect to a channel center, and these diagrams present examples in which the gate channels are arranged at a second-stage orifice symmetrically with respect to the channel center.

In the example of FIG. 27, the gate channels are formed in a direction vertical to the plane of a main channel (the plane of the chip) and are symmetrically connected to the second-stage orifice. In such case, introduction channels for the gate flows are formed in a surface opposite to a surface in which the main channel is formed, and unillustrated layers as covers for the channels can be disposed on upper and lower surfaces of the chip. Further, in such case, a sufficient space can be ensured around the orifice, the channel walls can remain thick as the individual channels are not adjacent, and the bonded parts of bonded surfaces in the chip can each have a large area, leading to advantages in mechanical strength.

In the example of FIG. 28, gate channels are formed in the same plane as the plane of the main channel and are symmetrically connected to the second-stage orifice. In this case, introduction channels for gate flows are formed in the same surface as the surface in which the main channel is formed, so that the microchip can be fabricated in a two-layer structure.

A fluid to be allowed to flow through the gate channels can be selected from a variety of fluids according to the use of microparticles to be collected after the sorting because the fluid becomes a main solvent for the microparticles. A fluid compatible with the microparticles such as, for example, a fluid medium used in the microparticle-containing fluid, the sheath fluid, or in a case where the microparticles are a protein, a surfactant-containing, pH-adjusted buffer solution, or the like can be allowed to flow at a constant flow rate.

Especially in a case where the microparticles are cells, a cell culture solution, a cell storage solution, or the like can be used. The use of a culture solution is suitable if a next step is performed for cells collected after sorting, for example, a step such as cell culture, cell activation, or gene transfer is performed. The use of a cell culture solution is suitable if collected cells are stored or transported. In a case where the sorted and collected cells are undifferentiated cells such as iPS cells, a differentiation-inducing solution can be used to efficiently proceed with next work.

Further, as a fluid to be allowed to flow through the gate channels, a solution having a blocking effect can also be used. The use of such a solution enables suppression of non-specific adsorption of cells on a collection container or bag after sorting. Blocking agents can include solutions containing one or more proteins such as albumin, solutions containing one or more amino acids such as glycine, and solutions containing one or more nonionic surfactants such as Pluronic F68.

Furthermore, as the fluid to be allowed to flow through the gate channels, a solution having cytolytic activity can also be used. The use of such a solution enables extraction of intracellular substances after sorting a target cell population. Solutions having cytolytic activity can include surfactant-containing solutions.

It is to be noted that the sheath fluid can similarly be selected from a variety of fluids. In the present specification, a flow which is formed of a fluid flowing through each gate channel (a gate flow fluid) is called a "gate flow."

In the upstream of the gate channel or channels, the fluid can independently be introduced from an unillustrated inlet to the gate channel or channels, and is allowed to flow at an appropriate flow rate. As the flow rate of the fluid introduced into the gate channel or channels is low relative to the flow rate of the fluid introduced into the sheath channel in the present technology, the above-described configuration is economical in a case where an expensive fluid such as a cell culture solution, a cell storage solution or a differentiation-inducing solution is used only through the gate channel or channels.

As an alternative, a gate flow is also allowed to occur as a branch flow from a sheath fluid flow.

Figure 2:
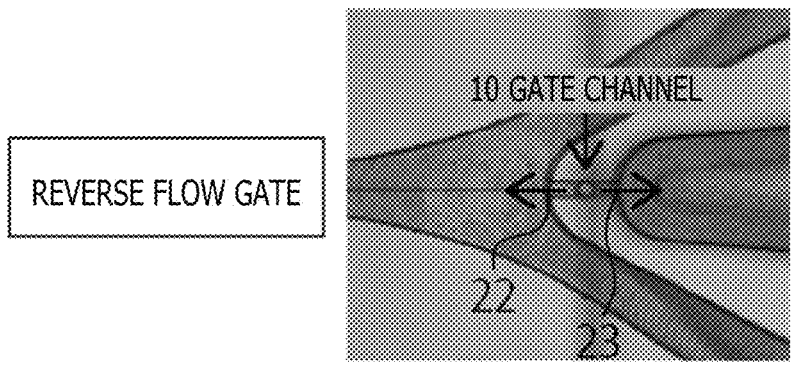
FIG. 2 is an enlarged diagram of a trap portion in the microparticle sorting microchip.
Figure 3:
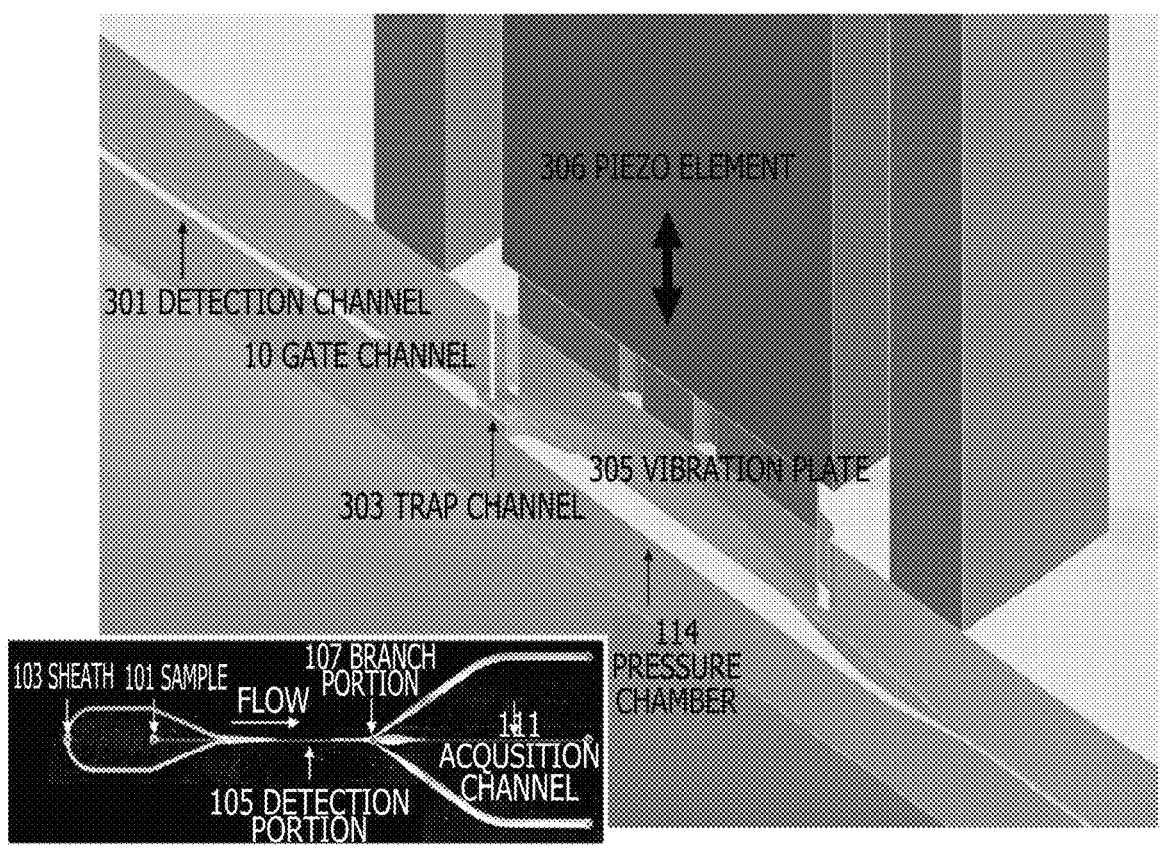
FIG. 3 is a diagram schematically presenting a vertical cross-section of the microparticle sorting microchip.

The sheath channel downstream of the sheath fluid inlet 103 of FIG. 1 and upstream ends of gate channels 10 of FIG. 2 or FIG. 3 can be connected together so that the sheath fluid flow branches and also flows into the gate channels to form gate flows. In such case, the channel resistance of each gate channel needs to be designed appropriately so as to achieve an appropriate flow rate.

At an intersection of the gate channel or channels and the trap channel, a gate flow directed toward a side of the detection section and a side of the pressure chamber also occurs along with a gate flow which tends to proceed straight through the gate channel or channels. By the gate flow directed toward the side of the detection section and the pressure chamber, it is possible to inhibit microparticles which are not to be acquired from entering the trap channel on the side of the pressure chamber. The gate flow or flows which has or have flowed through the gate channel or channels flows or flow out into the trap channel and branches or branch into gate flows directed toward the side of the detection section and the side of the pressure chamber in the trap channel. By the gate flow directed toward the side of the detection section in the trap channel, microparticles which are not to be acquired can be prevented from entering the trap channel on the side of the pressure chamber.

(2) Movements of Microparticle in Trap Portion

FIG. 2 presents, on an enlarged scale, a portion of the trap portion 113 of FIG. 1.

At the trap portion, the trap channel branches into three, that is, upper and lower branch channels and a thin central channel connected to the pressure chamber. A circle on the central channel indicates a connection point with the gate channel.

The gate channel 10 vertically intersects the central channel. Through the gate channel 10, the gate flow fluid always flows at a constant flow rate.

The gate flow fluid forms flows (arrow 22 and arrow 23) which branch at a place where the gate channel 10 and the trap channel intersect each other. The flow of the arrow 22 prevents stagnation of microparticles at an entrance to the trap channel. The flow of the arrow 23 transfers microparticles which have been trapped in the pressure chamber to the acquisition channel 111 of FIG. 1.

(3) Pressure Control of Pressure Chamber

FIG. 3 schematically presents a vertical cross-section of the microparticle sorting microchip.

A detection channel 301 is coaxially connected to a trap channel 303. With the trap channel 303, one or more gate channels 10 is or are connected in a T-shape configuration or intersects or intersect in a form of a cruciform or the like.

Further, the trap channel 303 is coaxially connected to the pressure chamber 114. The pressure chamber 114 includes a vibration plate 305, and a piezo element 306 is disposed over the vibration plate 305 via a spacer. By deformation of the piezo element 306, the vibration plate 305 vibrates, whereby the pressure chamber 114 is repeatedly controlled in internal pressure from a normal pressure to a negative pressure, or from a negative pressure or a normal pressure to a positive pressure.

By the negative pressure and the positive pressure or the normal pressure of the pressure chamber 114, a jet is caused to occur in a flow from the trap channel 303 to the pressure chamber 114.

Figure 4:
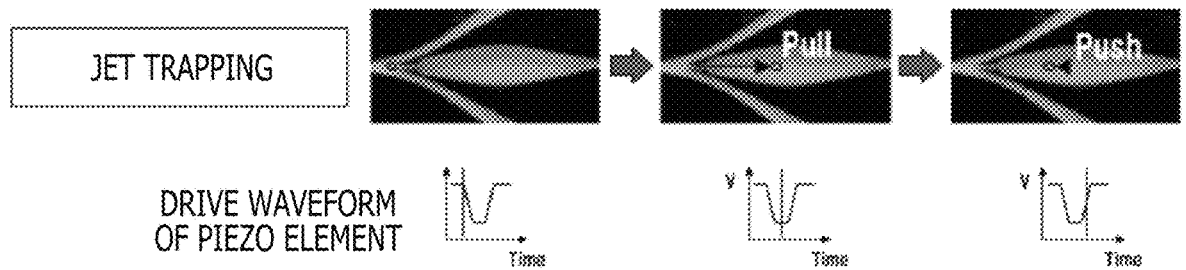
FIG. 4 presents diagrams illustrating movements of a microparticle by a jet occurred in the microparticle sorting microchip.

FIG. 4 illustrates movements of a microparticle by the jet occurred in the pressure chamber 114.

The lower row of FIG. 4 illustrates drive waveforms of the piezo element, and the upper row of FIG. 4 illustrates the movements of the microparticle corresponding to deformations of the piezo element.

The microparticle which has reached a front of the trap channel shortly before the deformation of the piezo element (left in FIG. 4) is drawn into the pressure chamber (center in FIG. 4) when the piezo element deforms and the pressure of the pressure chamber changes to a negative pressure. Subsequently, when the piezo element deforms and the pressure of the pressure chamber returns, a drawing force is released and a force acts to push out the microparticle (right in FIG. 4)

(4) Back Release of Microparticles

Figure 5:
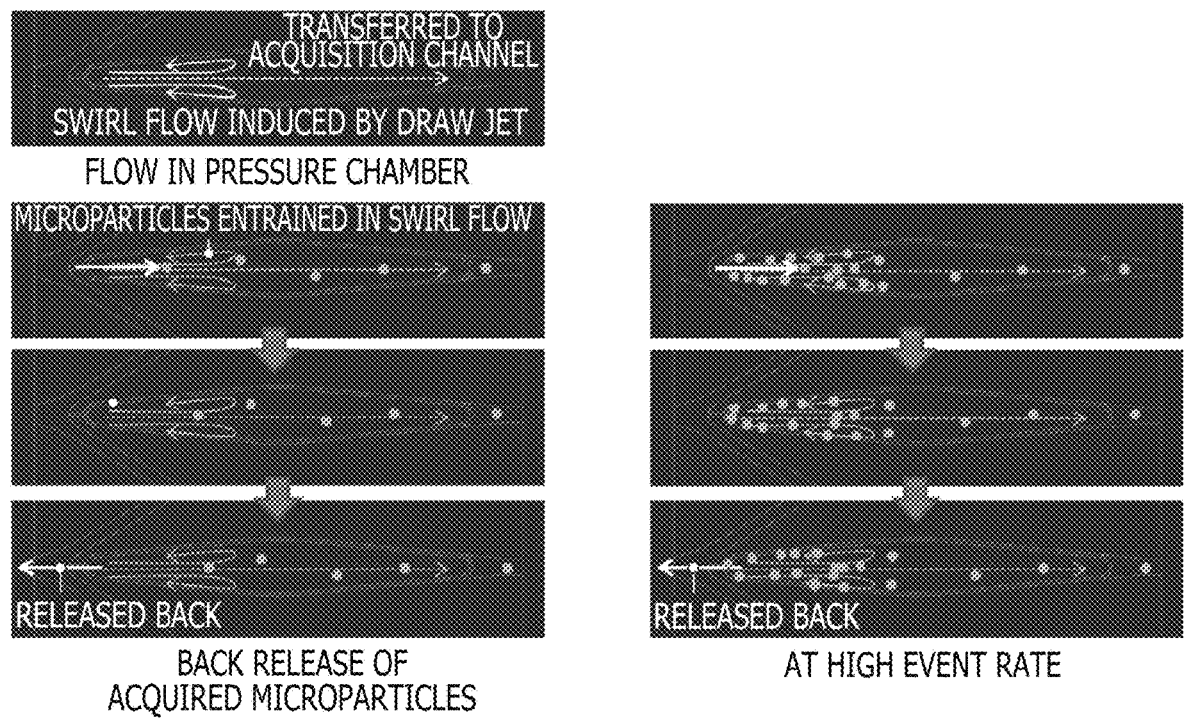
FIG. 5 presents enlarged diagrams of the trap portion and a pressure chamber in the microparticle sorting microchip.

FIG. 5 illustrates the trap portion 113 and the pressure chamber 114 of FIG. 1 on an enlarged scale.

As presented in upper left of FIG. 5, a main flow (dotted line) and a swirl flow (solid lines) which has been induced by a jet upon trapping microparticles occur in a flow in the pressure chamber. Trapped microparticles may be entrained in the swirl flow, and may swirl in the pressure chamber. FIG. 5 illustrates, in the upper row of the vertical series of three diagrams in the lower left, a microparticle entrained in the swirl flow.

If the microparticle entrained in the swirl flow happens to be located in a proximity of a trap channel upon subsequent eject operation for the acquisition of another microparticle (the middle row of the vertical series of three diagrams in the lower left of FIG. 5), the microparticle is released out of the pressure chamber (the lower row of the vertical series of three diagrams). Therefore, the acquisition rate of microparticles is lowered.

Especially at a high event rate, in other words, in a case where there are many trapped particles relative to those which can be carried by a transfer flow (the vertical series of three diagrams in the right of FIG. 5), the swirl flow also changes to a steady flow, the density of particles in the pressure chamber becomes even and high, and therefore the probability of back release to the outside of the pressure chamber increases.

Accordingly, a study was performed for further improvements in the trapping performance of microparticles.

(5) Improvements in Trapping Performance of Microparticles

For making improvements in the trapping performance of microparticles, sorting at higher speed may be achieved by reducing the channel resistance through shortening of the length of the trap channel. In addition, sorting at higher purity and higher acquisition rate may also be achieved by decreasing the draw volume in a direction toward the pressure chamber not only through shortening of the length of the trap channel but also through a reduction of its diameter. In addition, the concentration of cells diluted with a sheath fluid can be restored (made higher) to a certain extent by decreasing the draw volume in the direction toward the pressure chamber.

Figure 6:
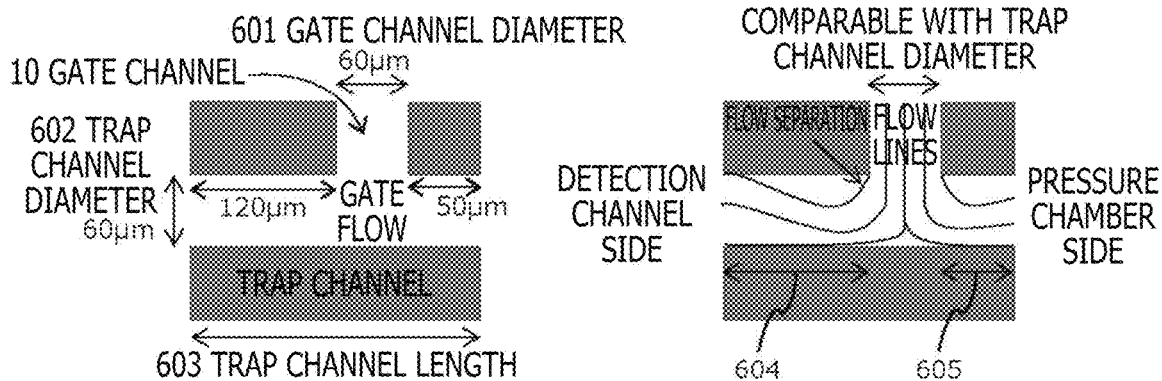
FIG. 6 presents enlarged diagrams of a portion where a gate channel is connected in a T-shape configuration to a trap channel in the microparticle sorting microchip.

FIG. 6 illustrates, on an enlarged scale, a portion where a gate channel is connected in a T-shape configuration to a trap channel.

To speed up trapping operation, there is a need to reduce the channel resistance of a trap channel. It is hence desired to shorten a trap channel length 603. As presented in FIG. 6, however, there is a limit to the shortening because of the structure that connects a gate channel to the trap channel.

Further, as indicated by the flow line in the right diagram of FIG. 6, when a gate flow reaches the trap channel, it branches toward the side of the detection channel and the side of the pressure chamber so that a flow separation occurs. In other words, at a connected portion, the flow separates and branches toward the side of the detection channel and the side of the pressure chamber. As a result, a flow in a vicinity of the connected portion of the trap channel with the gate channel tends to produce a flow shifted toward one side of the channel.

In view of the foregoing, for the exhibition of microparticle accumulation effects at the entrance to the trap channel, the trap channel length 603 may be necessary to be twice as much as a trap channel diameter 602 or more from the connected portion with the gate channel 10 (604). Also taking mechanical strength into consideration, the trap channel length 603 may be necessary to be twice to thrice as much as the trap channel diameter 602 or more.

Describing based on the example of FIG. 6, if the trap channel diameter 602 is assumed to be 60 μm, the trap channel length 603 may be necessary to be 230 μm or so under an additional assumption that an inlet side length 604 of the trap channel is 120 μm, a gate channel diameter is 60 μm, and an outlet side length 605 of the trap channel is 50 μm.

A discussion will next be made with regard to draw operation upon trapping microparticles. In the draw operation upon trapping microparticles, there is a need to draw a flow of a microparticle-containing fluid which contains a microparticle to be acquired, in a volume required to pass through the trap channel.

Figure 7:
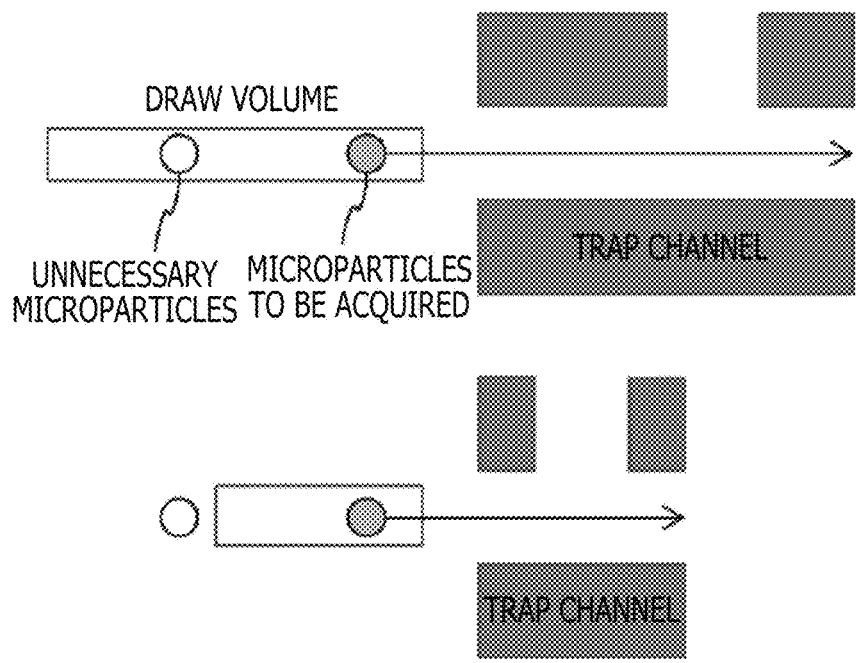
FIG. 7 presents diagrams each schematically illustrating a relationship between the length of a trap channel, the draw volume of a sample flow, and microparticles, in a microparticle sorting microchip.

FIG. 7 schematically illustrates a relationship among the length of a trap channel, the draw volume of a flow of a microparticle-containing fluid, and microparticles.

If a microparticle to be acquired and an unnecessary microparticle are close to each other, they are drawn together into the trap channel because the volume to be drawn into the trap channel becomes greater if the trap channel is long as presented in the upper row of FIG. 7.

If the trap channel is short as presented in the lower row of FIG. 7, on the other hand, a microparticle to be acquired and an unnecessary microparticle are not drawn together into the trap channel because the volume to be drawn into the trap channel becomes smaller. The microparticle to be acquired and the unnecessary microparticle can be differentiated accordingly. As a consequence, the purity of microparticles to be acquired can be raised, thereby enabling increase of the rate of acquisition.

(6) Relationship Between Shape of Trap Channel and Draw Volume

Figure 8:
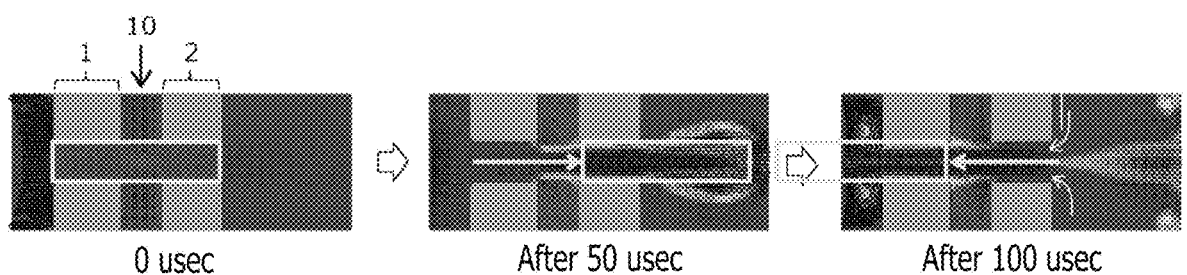
FIG. 8 presents diagrams schematically illustrating draw operation and eject operation of a microparticle-containing fluid in an example in which a trap channel and a gate channel intersect in a form of a cruciform in a microparticle sorting microchip.

FIG. 8 schematically illustrates draw operation and push-out operation of a microparticle-containing fluid in a trap channel.

A gate channel 10 intersects the trap channel. For example, the trap channel diameter can be set at 60 μm, and the overall trap channel length can be set at 250 μm. Assuming that the trap channel volume (the portion enclosed by white lines) is 0.9 nL (0 μsec), the microparticle-containing fluid in the order of 0.9 nL, which is close to the trap channel volume, is drawn from the trap channel toward the side of the pressure chamber (50 μsec). The microparticle-containing fluid is next ejected in an amount close to the trap channel volume (100 μsec, leftward arrow direction). When ejected, the microparticle-containing fluid in the pressure chamber also flows into the trap channel.

Figure 9:
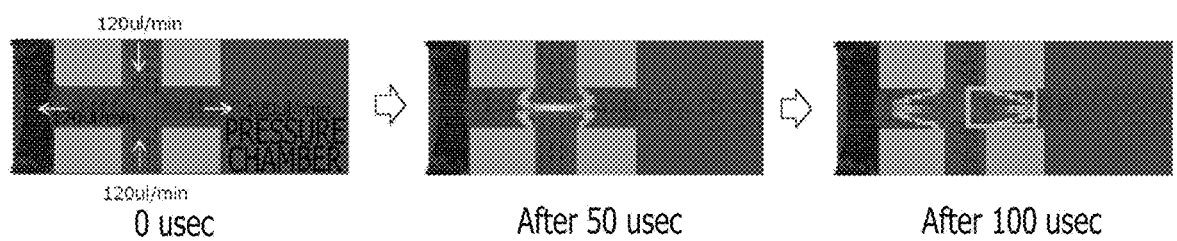
FIG. 9 presents diagrams schematically illustrating draw operation and eject operation of the microparticle-containing fluid in the trap channel when a gate flow is always flowing at a constant flow rate in the microparticle sorting microchip.

FIG. 9 schematically illustrates draw operation and push-out operation of the microparticle-containing fluid in the trap channel when a gate flow is always flowing at a constant flow rate.

Similarly to the above, the microparticle-containing fluid is drawn from the side of the trap channel toward the side of the pressure chamber and is pushed out.

The gate flow is also flowing in during the draw and push-out operations. For example, assuming that the drawing toward the side of the pressure chamber and the push-out operation from the side of the pressure chamber are performed in 100 μsec and the gate flow rate toward the side of the pressure chamber is 120 μL/min (left in FIG. 9), a portion of the gate flow separates and begins to flow into the trap channels on both sides (center in FIG. 9), and 100 μsec later, the microparticle-containing fluid flows in as much as 0.2 nL toward the side of the pressure chamber (right in FIG. 9, the portion enclosed by white lines).

As the abovementioned 0.9 nL and the 0.2 nL are close to each other in the order of magnitude, an idea was obtained that the push-out volume from the inside of the pressure chamber can be decreased and the back release can hence be prevented if a structure can be formed to decrease the draw volume and the push-out volume or trap channel volume and to also eject a volume of the gate flow which flows in during microparticle trap operation, from the trap channel toward the side of the pressure chamber.

2. Embodiment 1

In Embodiment 1, acquired microparticles which have once been trapped toward a side of a pressure chamber are not released back, and hence a structure with a two-staged trap channel is adopted as an example.

Described specifically, a microparticle sorting microchip according to the present technology includes:

a main channel through which a microparticle-containing fluid flows, a trap channel coaxially communicating with the main channel, and a pressure chamber coaxially communicating with the trap channel, the trap channel includes a first-stage trap channel and a second-stage trap channel, the first-stage trap channel includes a first ejection portion, the second-stage trap channel includes a second ejection portion, the first-stage trap channel includes at a downstream end thereof an opening that functions as an orifice, the opening of the first-stage trap channel has an area equal to or smaller than a minimum cross-sectional area of the second-stage trap channel, and the second-stage trap channel includes one or more gate channels, for example, connected in a T-shape configuration or intersecting in a form of a cruciform or the like, with an upstream end thereof.

The opening at the downstream end of the first-stage trap channel is connected at the position of the gate channel that is connected or intersects at the upstream end of the second-stage trap channel.

Figure 10:
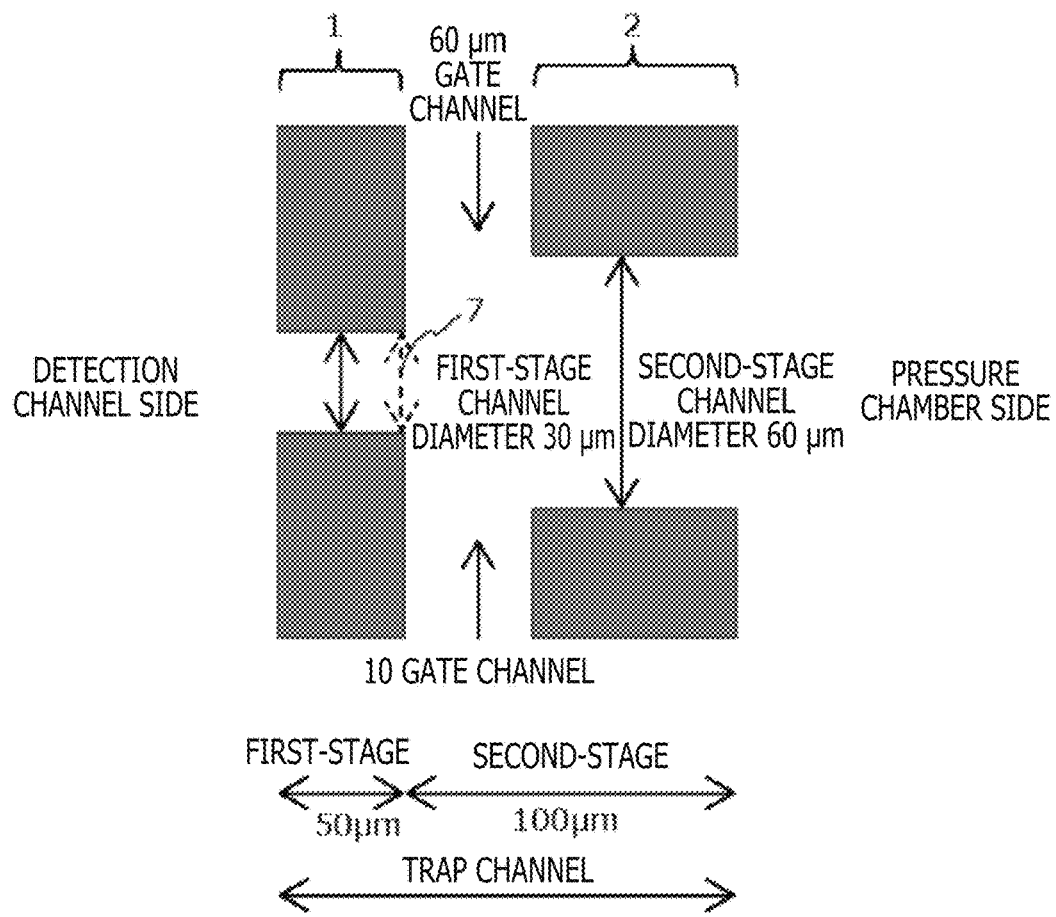
FIG. 10 presents diagrams which illustrate a two-staged trap channel in a microparticle sorting microchip.
Figure 10:
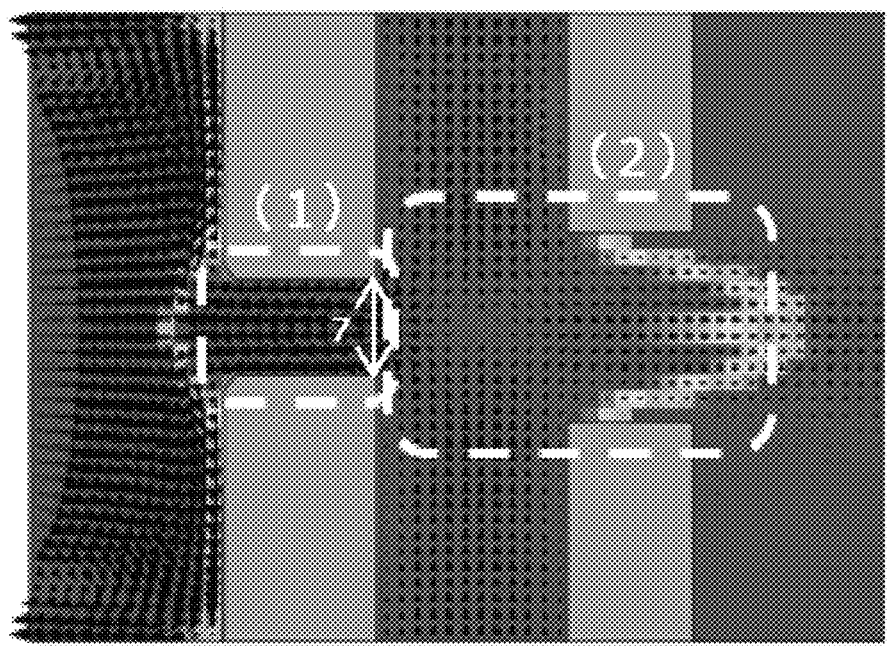

FIG. 10 illustrates a two-staged trap channel.

The first stage of the trap channel includes a first ejection portion 1 having a channel diameter of 30 μm and a length of 50 μm. At the downstream end of the first stage of the trap channel, there is an opening 7 that functions as an orifice (upper row in FIG. 10).

In the first stage of the trap channel, a flow of a microparticle-containing fluid forms a jet upon drawing of the microparticle-containing fluid. At the first stage, the channel length is set short and/or the channel diameter is set small, and the channel volume is set small ((1) in the lower row of FIG. 10).

The second stage of the trap channel is set larger in diameter (channel dimeter 60 μm) than the channel dimeter of the first stage, whereby resistance is reduced. In addition, the gate flow is connected to the second stage (gate channel diameter 60 μm). The volume of the second stage is set at a size large enough to hold the flowed-in volume of the gate flow, or at a size large enough to avoid the separation of the gate flow which flows in, and to hold the draw or push-out volume ((2) in the lower row of FIG. 10).

Figure 11:
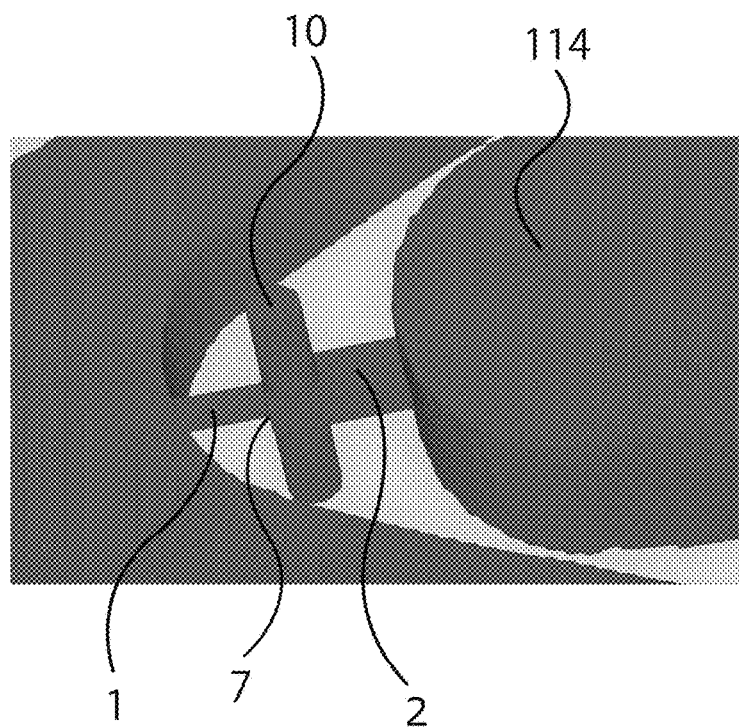
FIG. 11 is a diagram presenting the two-staged trap channel in the microparticle sorting microchip.

The structure of FIG. 10 is presented three-dimensionally in FIG. 11.

Through the gate channel 10 disposed so that the gate channel 10 intersects between the first-stage trap channel 1 and the second-stage trap channel 2, a gate flow is formed, and a jet occurs from an opening 7 of the first-stage trap channel 1 toward the gate flow. The gate flow with the jet included therein flows out into the second-stage trap channel having a cross-sectional area greater than the opening of the first-stage, and flows toward the side of the pressure chamber. On the other hand, gate flows that branch toward the side of the detection section and the side of the pressure chamber also occur. The gate flow that branches toward the side of the detection section can prevent microparticles which are not to be acquired from entering toward the side of the pressure chamber.

Figure 12:
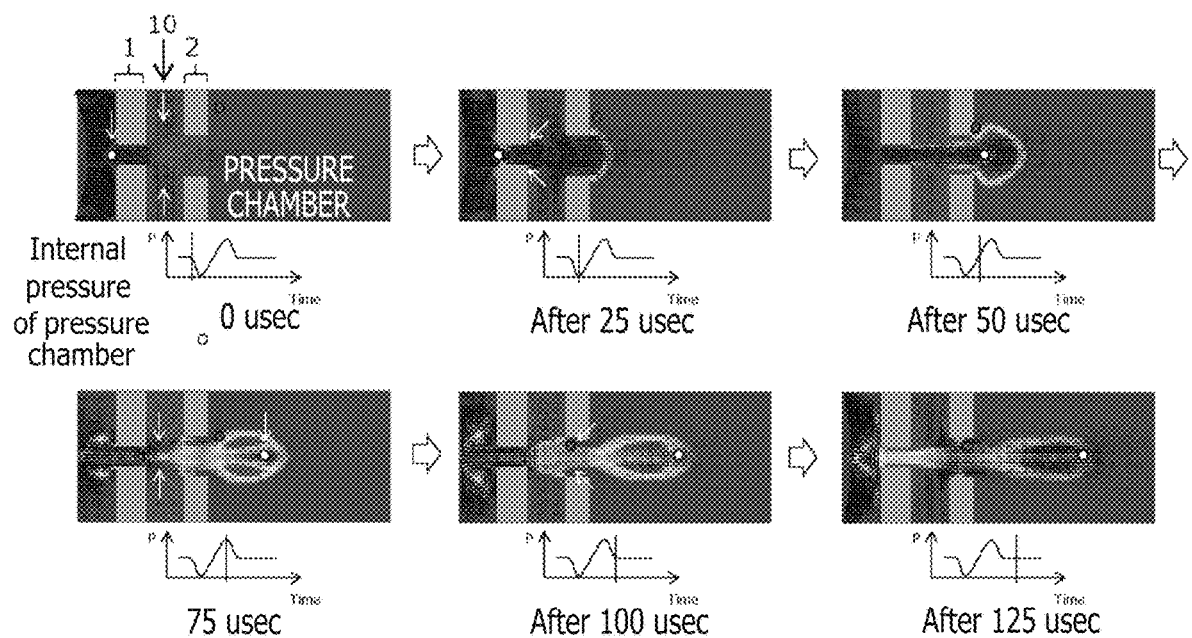
FIG. 12 presents diagrams illustrating microparticle trap operation in the trap channel of the microparticle sorting microchip.

FIG. 12 illustrates microparticle trap operation in the trap channel in the present embodiment.

In the left diagram in the upper row, gate flows are always introduced in the directions of the upper and lower arrows at 120 μL/min, for example. At this time (0 μsec), the pressure of the pressure chamber is normal (normal pressure). When a particle to be acquired (white dot in FIG. 12) comes to the entrance to the trap channel, negative pressure control of the pressure chamber is started.

In the center diagram in the upper row (25 μsec), the pressure of the pressure chamber changes to a negative pressure, and a flow at the downstream end of the first stage of the trap channel separates so that a jet occurs.

In the right diagram (50 μsec) in the upper row, the pressure of the pressure chamber returns from the negative pressure to a normal pressure.

Next, even when the pressure of the pressure chamber has returned to the positive pressure and push-out operation begins in the left diagram in the lower row (75 μsec), a microparticle entrained in the jet is not released immediately. Further, the gate flow continues to flow in during the push-out operation, and from around the downstream end of the first stage of the trap channel, the flow of the microparticle-containing fluid is replaced by the gate flow.

In the center diagram in the lower row (100 μsec), the pressure of the pressure chamber returns from the positive pressure to the normal pressure.

Those released by the push-out operation are a jet wake and the gate flow, and there is not much release from the inside of the pressure chamber. In other words, back release of microparticles is suppressed.

In the right diagram in the lower row (125 μsec), even if a microparticle (black dot in FIG. 12) enters the second-stage trap channel from the pressure chamber during push-out operation, the microparticle is pushed back into the pressure chamber by the gate flow until the next trap operation is performed.

Figure 13:
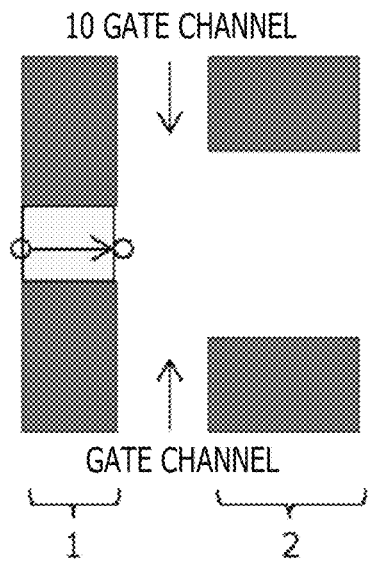
FIG. 13 is a diagram schematically illustrating a trap channel having a first-stage trap channel and a second-stage trap channel.

FIG. 13 schematically illustrates a trap channel including a first-stage trap channel and a second-stage trap channel.

The first-stage trap channel is circular in cross-section. Further, the first-stage trap channel, specifically in this example, a first ejection portion 1, is connected at a downstream end thereof to gate channels 10, and a gate flow fluid flows at a constant flow rate through the gate channels 10.

The internal pressure of the pressure chamber is subjected to repeated pulse control from a negative pressure to a positive pressure by a piezo element.

When the internal pressure of the pressure chamber is the negative pressure, the flow of the microparticle-containing fluid which contains a microparticle to be acquired is drawn from the first-stage trap channel toward the side of the pressure chamber.

Now simply assume that the first ejection portion 1 is circular in cross-section and the flow of the microparticle-containing fluid is subjected to acceleration and deceleration in a sine waveform. For allowing a microparticle which is located at a center of the upstream end of the first ejection portion 1 to reach the downstream end from the upstream end (the movement of the circle (microparticle) in FIG. 13), it is approximately calculated necessary to draw half (½) as much as the volume of the first ejection portion 1. Therefore, the drawing of the flow of the microparticle-containing fluid from the first ejection portion 1 can preferably be set to give a draw amount that is half as much as the volume of the first ejection portion 1 (the first-stage trap channel) or greater.

Figure 14:
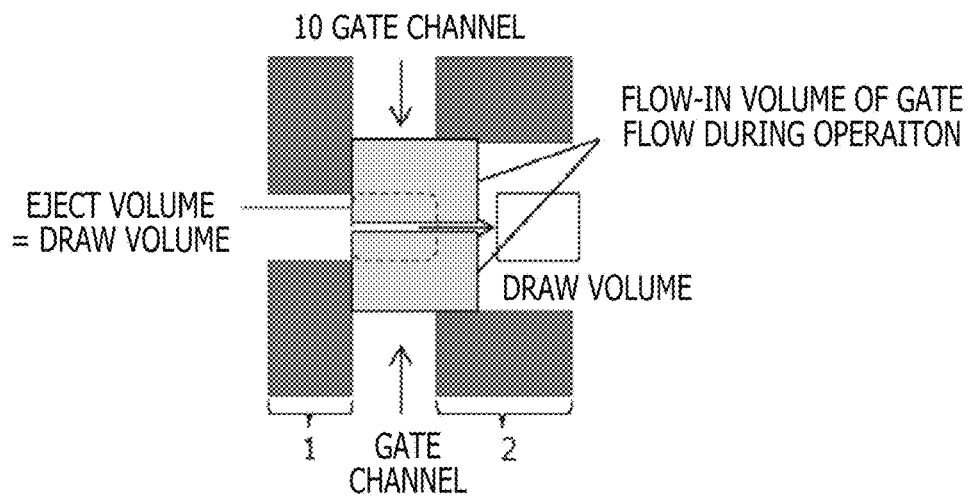
FIG. 14 is a diagram schematically illustrating a relationship between the draw volume of a trap channel and the flow-in volume of gate flows.

FIG. 14 schematically illustrates a relationship between the draw volume from the first ejection portion 1 and the flow-in volume of the gate flows.

If the internal pressure of the pressure chamber is changed to a negative pressure, a flow of the microparticle-containing fluid is drawn from the first ejection portion 1. While the internal pressure of the pressure chamber is subjected to pulse control from the negative pressure to a positive pressure or a normal pressure, the gate flows flow into the first ejection portion 1.

The flow-in volume of the gate flows at this time may preferably be the same volume as or a volume greater than the draw volume of the flow of the microparticle-containing fluid.

This is because, if the flow-in volume of the gate flows during trap operation is greater than the draw volume of the flow of the microparticle-containing fluid, substantially the same volume as the draw volume in a vicinity of the downstream end of the first ejection portion 1 is ejected, thereby enabling decrease in the volume to be released from the pressure chamber.

Figure 15:
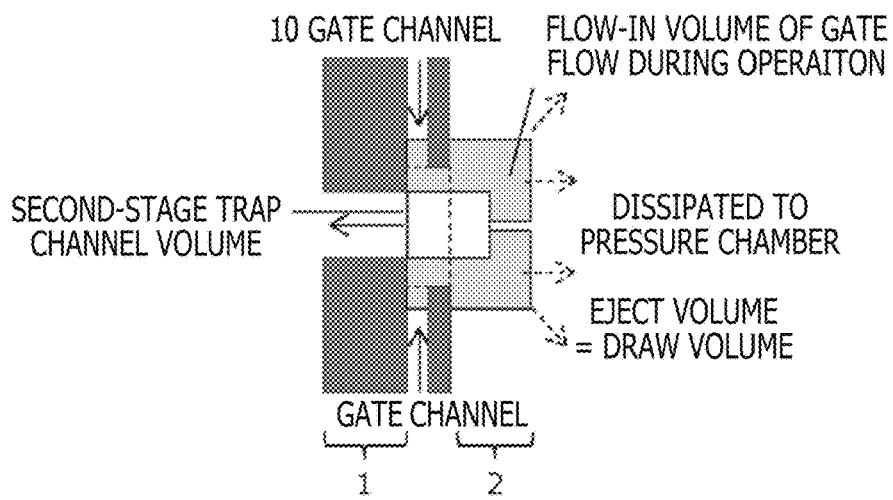
FIG. 15 is a diagram schematically illustrating a relationship between the draw volume of a trap channel and the flow-in volume of gate flows.

FIG. 15 schematically illustrates a relationship between the eject volume to a second-stage trap channel 2 and the flow-in volume of gate flows.

The first ejection portion 1 of a first-stage trap channel has at a downstream end thereof an opening that functions as an orifice, and gate channels 10 are disposed on a side of the pressure chamber. A gate flow fluid always flows at a constant flow rate through the gate channels to form the gate flows. Portions of the gate flows branch from a second-stage trap channel in a direction toward the side of a detection channel and in a direction toward the side of the pressure chamber (the direction to the second ejection portion).

When a microparticle first reaches an upstream end of the first-stage trap channel, the pressure chamber is changed in internal pressure to a negative pressure to draw a flow of a microparticle-containing fluid into the first-stage trap channel. A jet occurs from the downstream end (an opening) of the first-stage trap channel, and a microparticle entrained in the jet passes through the second-stage trap channel. After the microparticle reaches an inside of the pressure chamber, the internal pressure of the pressure chamber changes to a positive pressure. The flow of the microparticle-containing fluid which has once been drawn into the pressure chamber and the gate flow are then pushed out toward the side of the first-stage trap channel.

At this time, the volume (the dashed line portion) of the second-stage trap channel of FIG. 15 may preferably be the same as or greater than the volume to be pushed out in a direction toward the trap channel 1 when the internal pressure of the pressure chamber is changed to the positive pressure or a normal pressure.

This is because, with the volume of the second-stage trap channel being smaller than the volume to be pushed out by push-out operation as in FIG. 15, even if the gate flow is introduced in a large volume, the second-stage trap channel cannot hold the gate flow in its entirety, the gate flow dissipates into the pressure chamber, and upon push-out operation, the fluid is pushed out from the pressure chamber.

Preferably, the pressure chamber is next changed in internal pressure to a negative pressure, whereby the fluid is pushed out from the second-stage trap channel to the pressure chamber to make the volume of the fluid in the pressure chamber equal to the volume of the second-stage trap channel or smaller.

3. Embodiment 2

Preferably, the microparticle sorting microchip of the present technology includes a plurality of gate channels, and the plurality of gate channels is connected to the upstream end of the second-stage trap channel so that the gate channels are symmetrical to each other with respect to the center of the flow of the microparticle-containing fluid from the opening which functions as the orifice.

This is because, if the gate channels are asymmetrically connected with respect to the center of the trap channel, a flow in the trap channel is also asymmetrical, an unintended secondary flow occurs, and particles may enter the trap channel from the inside of the pressure chamber.

Figure 16:
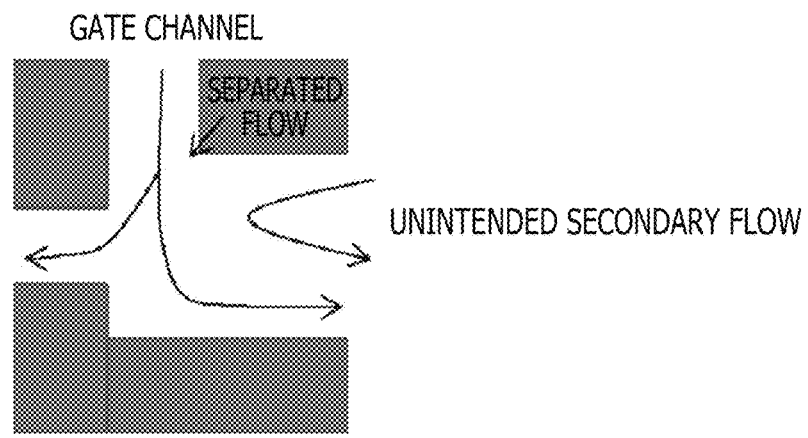
FIG. 16 is a diagram illustrating a situation where a gate channel is asymmetrically connected to a trap channel.

FIG. 16 illustrates an example in which a gate channel is asymmetrically connected to a trap channel.

If the gate channel is connected to only one side of the trap channel, separation of a flow occurs at the connected portion when the gate flow rate is high. Then, the flow sticks to a surface which is located opposite to the connected portion, in the second-stage trap channel, and an unintended secondary flow occurs.

Gate channels are therefore disposed symmetrically with respect to the center of the trap channel, in other words, the center of the flow of the microparticle-containing fluid from the opening that functions as the orifice.

If the gate channels are symmetrically disposed, the flow rate of a flow from each gate channel can be decreased, the velocity of the flow can be reduced at the portion where the channel is connected, and separation of a flow can be reduced.

Further, an unintended secondary flow hardly occurs because the flow in the trap channel is also symmetrical.

It is to be noted that the inclusion of two or more (plural) gate channels is preferred although a single gate channel can be included as presented in FIG. 1 or two or more gate channels can be included as presented in FIGS. 27 and 28. In addition, not only an even number of gate channels, such as 2 or 4, but also an odd number of gate channel or channels, such as 1, 3, or 5, can be adopted.

Figure 17:
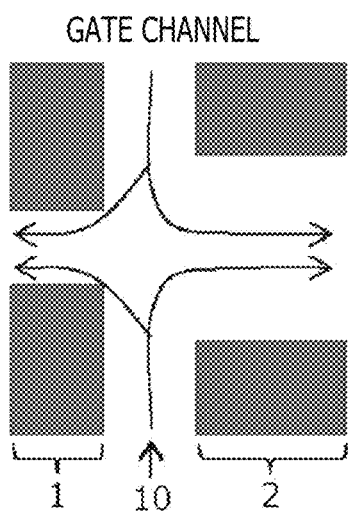
FIG. 17 is a diagram illustrating a situation where gate channels are symmetrically connected to a trap channel.

FIG. 17 illustrates an example in which gate channels are symmetrically connected to a trap channel.

If the two gate channels are disposed, for example, one from above and the other from below, and a gate flow fluid is introduced at half the flow rate, the separation of flows is reduced at connected portions with the trap channels and is symmetrical, thereby decreasing the occurrence of an intended secondary flow.

4. Embodiment 3

The shape of the cross-section of the trap channel can be, for example, a square, rectangle, circle, or ellipse, and no particular limitation is imposed thereon. Further, the trap channel can not only be a parallel-sided channel but can also be a tapered channel.

Figure 18:
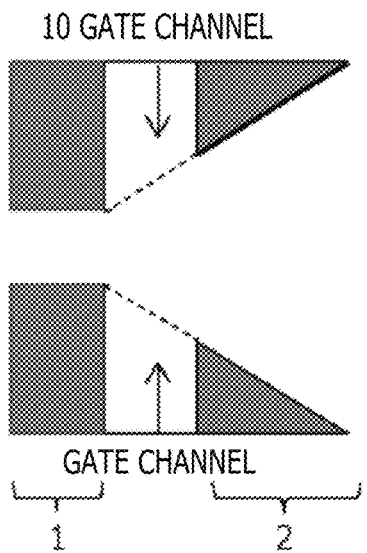
FIG. 18 is a diagram illustrating an example in which a second-stage trap channel is a tapered channel.
Figure 19:
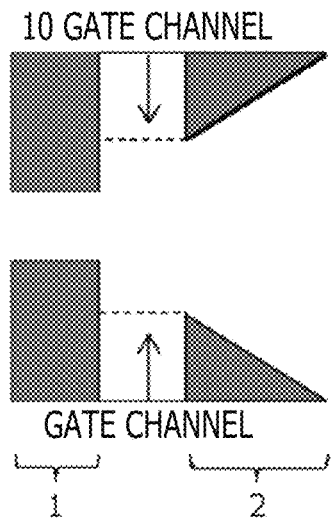
FIG. 19 is a diagram illustrating another example in which a second-stage trap channel is a tapered channel.

FIG. 18 illustrates an example in which tapering begins from immediately downstream of a connected portion with a gate channel, and FIG. 19 illustrates another example in which tapering begins from an upstream end of a second-stage trap channel.

In FIG. 18, a second ejection portion 2 of the second-stage trap channel is a tapered channel, and therefore the second-stage trap channel decreases in volume near a first-stage trap channel. Accordingly, it is possible to efficiently store gate flows that flow out during eject operation from the side of the pressure camber, and to also decrease a resistance to a jet during draw operation. The second-stage trap channel decreases in volume near a first-stage trap channel. It is therefore possible to decrease a resistance to a jet during draw operation.

5. Embodiment 4

As an alternative, the first-stage trap channel can be a tapered channel.

Figure 20:
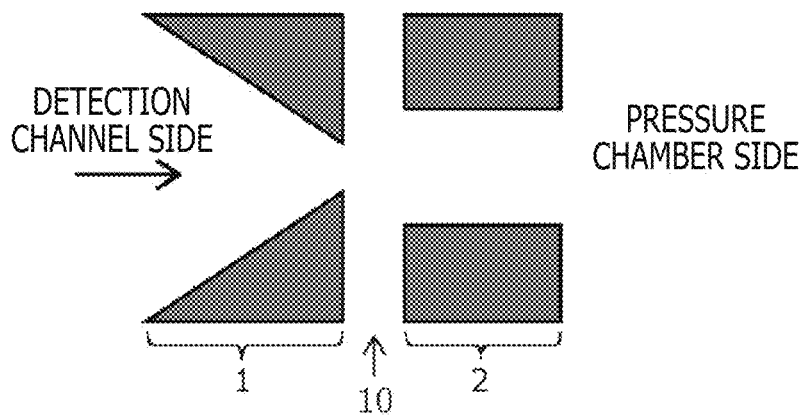
FIG. 20 is a diagram illustrating an example in which a first-stage trap channel is a tapered channel.

FIG. 20 illustrates an example in which a first-stage trap channel is a tapered channel.

If such a structure is adopted, a jet can efficiently be caused to occur at a downstream end without the channel resistance of the first-stage trap channel being increased.

6. Embodiment 5

Moreover, the first-stage trap channel and the second-stage trap channel can each be a tapered channel.

Figure 21:
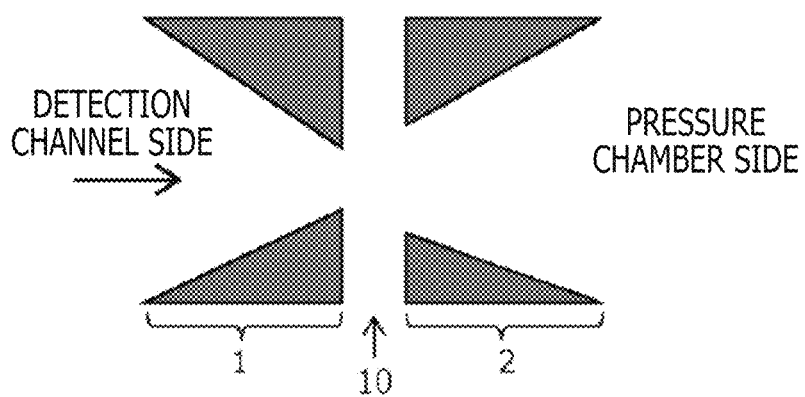
FIG. 21 is a diagram illustrating an example in which a first-stage trap channel and a second-stage trap channel are each a tapered channel.

FIG. 21 illustrates an example in which a first-stage trap channel and a second-stage trap channel are each a tapered channel.

In this case as well, the second-stage trap channel 2 is set to have a greater minimum cross-sectional area than the first-stage trap channel 1.

The adoption of such a structure enables intensification of the power of a jet from an opening at a downstream end of the first-stage trap channel, and to also decrease the volume of the second-stage trap channel near the first-stage trap channel so that a resistance to a jet can be reduced during draw operation. Further, a jet can efficiently be caused to occur at a downstream end without the channel resistance of the first-stage trap channel being increased.

7. Embodiment 6

The trap channel can be separated not only in two stages but also in three or more stages.

Figure 22:
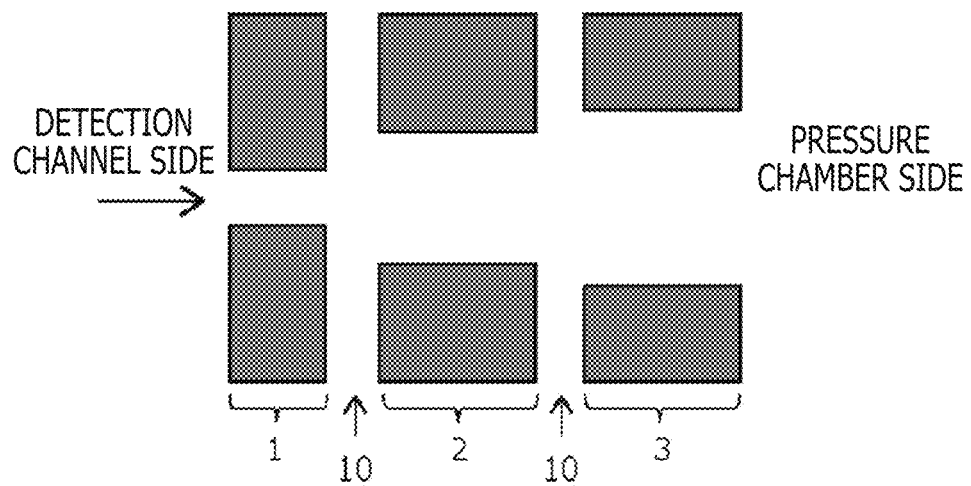
FIG. 22 is a diagram illustrating an example having a three-stage trap channel.

FIG. 22 illustrates an example having a first-stage trap channel (including a first ejection portion 1), a second-stage trap channel (including a second ejection portion 2), and a third-stage trap channel (including a third ejection portion 3).

The first-stage, second-stage, and third-stage trap channels can each have, at a downstream end thereof, an opening that functions as an orifice. The area of each opening is set equal to or smaller than the minimum cross-sectional area of the trap channel on the immediately downstream side.

A gate channel 10 can intersect each of an upstream end of the second-stage trap channel and an upstream end of the third-stage trap channel.

8. Embodiment 7

In a case where the trap channel is separated in three stages, there can be a mode in which the gate channel 10 intersects the upstream end of the second-stage trap channel but no gate channel is connected to the third-stage trap channel.

Figure 23:
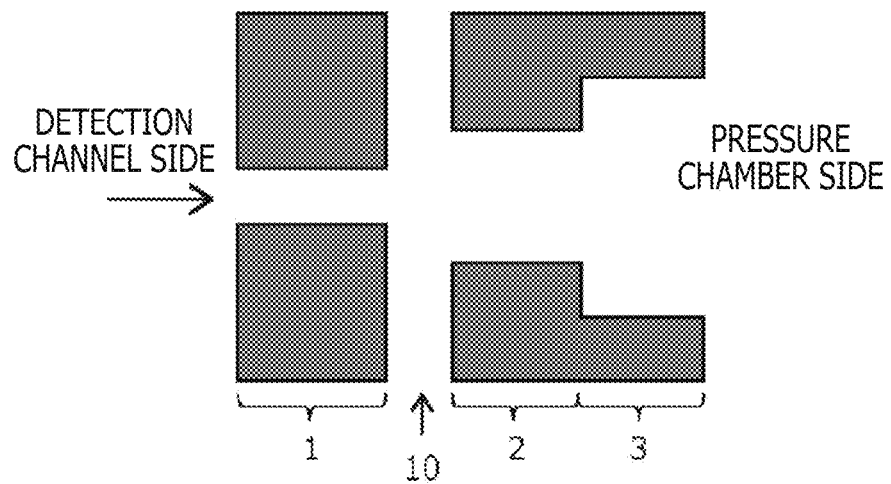
FIG. 23 is a diagram illustrating an example having another three-stage trap channel.

FIG. 23 illustrates an example in which a gate channel intersects an upstream end of a second-stage trap channel but no gate channel is connected to a third-stage trap channel.

9. Embodiment 8

In the case where the trap channel is separated in three stages, there can be a mode in which a gate channel 10 intersects the upstream end of the third-stage trap channel.

Figure 24:
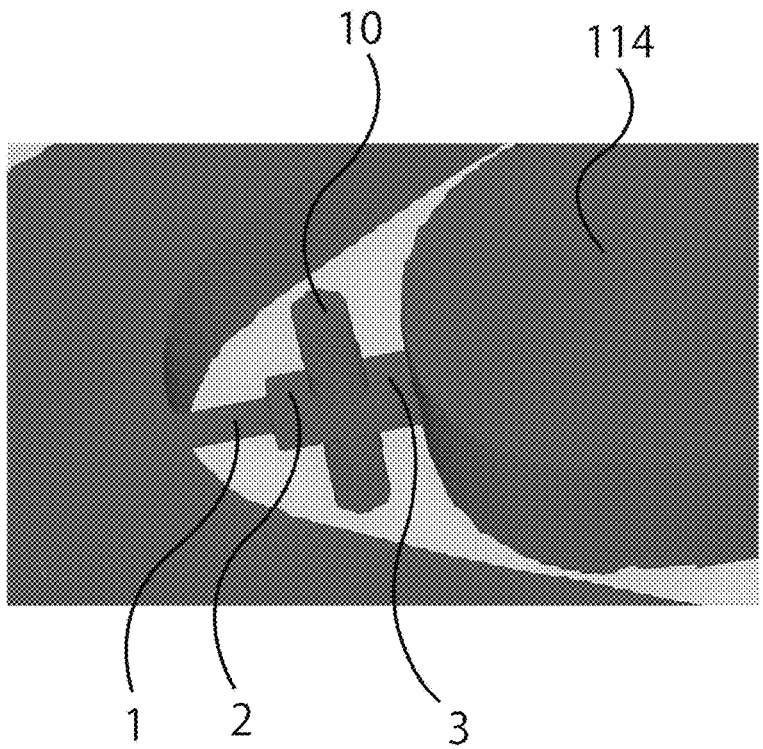
FIG. 24 is a diagram presenting an example having a further three-stage trap channel.

FIG. 24 illustrates an example in which no gate channel is connected to an upstream end of a second-stage trap channel but a gate channel is connected intersecting an upstream end of a third-stage trap channel. Here, the second-stage trap channel and the third-stage trap channel can have the same cross-sectional area.

10. Embodiment 9

Figure 25:
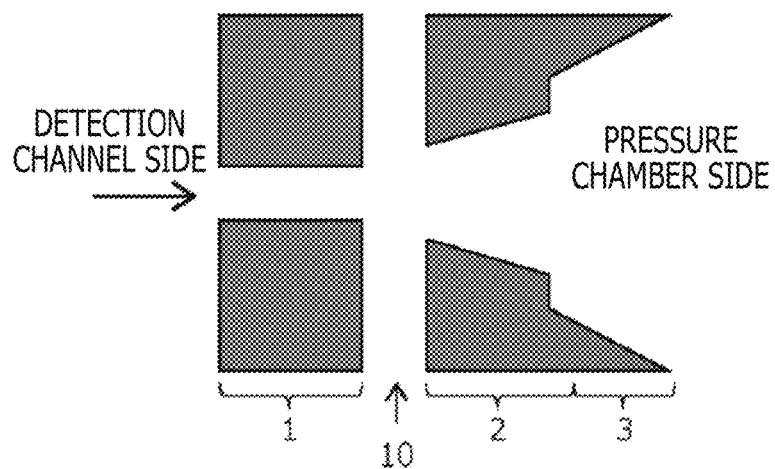
FIG. 25 is a diagram illustrating an example having a still further three-stage trap channel.

FIG. 25 illustrates an example in which a trap channel is separated in three stages, the second-stage and third-stage trap channels are tapered, and a gate channel 10 intersects an upstream end of the second-stage trap channel, but no gate channel is connected to the third-stage trap channel.

It is to be noted that the shape of the trap channel in the present technology is not limited to the above-described examples of the embodiment and a variety of trap channel shapes can be adopted within a scope not losing the advantageous effects of the present invention.

11. Embodiment 10

In the microparticle sorting microchip according to the present technology, a connection channel can be disposed between a trap channel and a pressure chamber.

Figure 26:
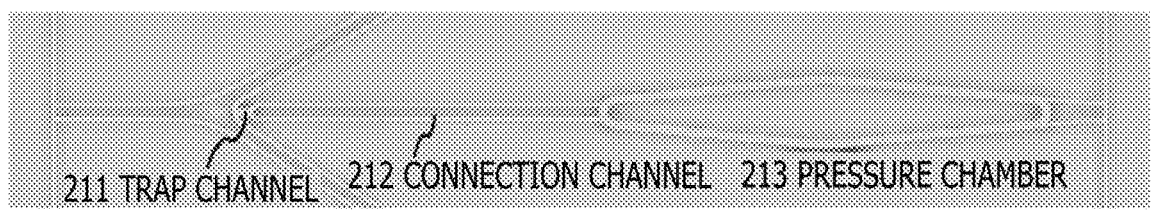
FIG. 26 is a diagram illustrating an example in which a microparticle sorting microchip is provided with a connection channel.

FIG. 26 illustrates an example in which a connection channel is disposed.

The cross-sectional area of the connection channel can be set greater than that of the trap channel. In the connection channel, a microparticle detection region or the like can also be arranged.

In a case where no connection channel is disposed, connection of a piezo element to a pressure chamber, for example, leads to insufficient space even if it is desired to dispose a component or the like in addition to the piezo element. By the adoption of the above-described structure, however, a wider space can be ensured around the pressure chamber, leading to an increase in design freedom.

12. Embodiment 11

The microparticle sorting microchip of the present technology can include a microparticle-containing fluid inlet, a sheath fluid inlet, a microparticle collection portion, and the like, and a structure with the individual portions appropriately connected together can also be adopted.

As mentioned above with reference to FIG. 1, the microparticle-containing fluid is introduced from the microparticle-containing fluid inlet 101. The sheath fluid is introduced from the sheath fluid inlet 103. The microparticle-containing fluid and the sheath fluid form a laminar flow in the sheath flow forming portion 112, and flow through the main channel.

Immediately before the main channel communicates to the trap channel, the main channel branches into the trap channel on the same axis and a plurality of separate branch channels. The gate channel intersects the trap channel.

At an upstream side of the gate channel, the gate flow fluid can independently be introduced from an unillustrated gate channel inlet and is allowed to flow at an appropriate flow rate. Further, a gate flow can be caused to branch and occur from a sheath fluid flow. As illustrated in FIG. 1, the gate flow can be induced by connecting the sheath channel with an upstream end of the gate channel downstream of the sheath fluid inlet with the sheath fluid flow being branched and flowing into the gate channel. In such case, there is a need to appropriately design the channel resistance of the gate channel so that an appropriate gate flow rate is obtained.

In addition, connection channels can be connected to a sheath fluid container and a gate fluid container. If necessary, a pump can be provided to control the flow of the sheath fluid or a filter can be provided to pass the sheath fluid through the filter. The sheath fluid can be reused by such a structure.

Moreover, the microparticle collection portion can be arranged downstream of the pressure chamber to collect trapped microparticles. The collected microparticles are furnished for measurement, analysis, and/or the like. In a case where the microparticles are cells, they are also provided for proliferation or the like.

12. Microparticle Sorting Apparatus (1) Configuration

The microparticle sorting apparatus of the present technology includes:

a microchip mounting portion configured to mount thereon the above-mentioned microparticle sorting microchip, a light application section that applies light onto a microparticle detection region in the microparticle sorting microchip, a detection section that detects scattered light and/or fluorescence emitted from each microparticle by the application of the light, and a pressure chamber control section that changes an internal pressure of a pressure chamber to a negative pressure or a positive pressure.

The microchip mounting portion of the microparticle sorting apparatus may be configured to enable easy attachment and detachment of the microparticle sorting microchip. In such case, the microparticle sorting microchip can be a disposable one or one that is reusable by performing washing or the like.

The light application section of the microparticle sorting apparatus applies light such as excitation light onto microparticles which are flowing through the main channel or the communication passage. The light application section may include a light source configured to emit light and an objective lens configured to focus the light onto the microparticles which are flowing through the main channel or the communication passage.

The light source can appropriately be selected from laser diodes, SHG lasers, solid state lasers, gas lasers, high brightness LEDs, and the like according to the purpose such as discrimination of microparticles to be acquired.

The light application section may also include, in addition to the light source and the objective lens, one or more other optical elements as needed.

The detection section of the microparticle sorting apparatus can detect scattered light and/or fluorescence emitted from the microparticles by the application of light from the light application section. The detection section may include a condenser lens which is configured to focus the fluorescence and/or scattered light emitted from the microparticles, and a detector.

Specific detectors can include, but are not limited to, PMTs, photodiodes, CCDs, CMOSs, and the like.

Further, the detection section may also include, in addition to the condenser lens and the detector, one or more other optical elements as needed.

The fluorescence can be, for example, fluorescence generated from the microparticles themselves, or fluorescence emitted from a material labeled on microparticles, for example, a fluorescent material or the like, but is not limited to such fluorescence.

The scattered light can be, for example, geometric optical scattering light, Rayleigh scattering light, and/or Mie scattering light, and a configuration that detects such light as forward scattered light or side scattered light is usual. However, the scattered light is not limited to such light.

The pressure chamber control section of the microparticle sorting apparatus controls, on the basis of data detected at the detection section, whether microparticles which are flowing through the main channel or communication passage of the microparticle sorting microchip are to be allowed to proceed to the branch channels or are to be drawn into the particle sorting channel.

The fluorescence and scattered light detected by the detection section can be converted to electric signals.

In such case, the microparticle sorting apparatus includes an electric signal conversion section. The electric signal conversion section may be included in the pressure chamber control section, or may not be included in the pressure chamber control section.

The pressure chamber control section can receive such electric signals and can determine optical characteristics of microparticles on the basis of the electric signals.

In a case where a microparticle is found to be acquired on the basis of results of determination of optical characteristics of the microparticle, the pressure chamber control section controls the internal pressure of the pressure chamber so that the flow through the channel is changed to allow the microparticle to proceed to the trap channel through the opening which functions as an orifice. To draw the microparticle into the trap channel, the internal pressure of the pressure chamber is only required to be changed to a negative pressure.

The change of the flow through the channel can be performed, for example, by repeatedly controlling the internal pressure of the pressure chamber from the negative pressure to a positive pressure or normal pressure, or from the positive pressure or normal pressure to the negative pressure. If the internal pressure of the pressure chamber is changed to the positive pressure or normal pressure, the flow through the channel can be changed again. Such specific pressure control of the pressure chamber can be performed by using an actuator, for example, a piezo element, and deforming the piezo element. The pressure chamber control section can adopt a similar configuration as the drive section described in JP 2014-036604 A.

(2) Microparticle Sorting Program

The pressure chamber control section of the microparticle sorting apparatus can store a microparticle sorting program for performing the above-mentioned operation. As an alternative, it is possible to connect together the pressure chamber control section and a computer that includes the microparticle sorting program.

The program is stored and held in a hard disk, and under control by a CPU or an OS, is read in a memory to perform the above-mentioned trap operation.

The program can be made available in a form recorded on a computer-readable recording medium. No particular limitation is imposed on the recording medium insofar as it is a recording medium readable by computers. Specifically, a disk-shaped recording medium such as a flexible disk or CD-ROM is used, for example. A tape recording medium such as a magnetic tape can also be used. Further, it is also possible to adopt a configuration that configures a part of processing with a hardware such as a DSP (Digital Signal Processor), an ASIC (Application Specific Integrated Circuit), a PLD (Programing Logic Device), an FPGA (Field-Programmable Gate Array) or the like and performs high-speed processing in cooperation with the above-described software program.

It is to be noted that the present technology can also adopt the following configurations.

[1]

A microparticle sorting microchip including:

a main channel through which a microparticle-containing fluid flows;

a trap channel coaxially communicating with the main channel; and a pressure chamber coaxially communicating with the trap channel, in which the trap channel includes an upstream-stage trap channel and a downstream-stage trap channel, the upstream-stage trap channel includes at a downstream end thereof an opening that functions as an orifice, the opening at the downstream-end of the upstream-stage trap channel has an area equal to or smaller than a minimum cross-sectional area of the downstream-stage trap channel, the downstream-stage trap channel includes, at an upstream end thereof, one or more connected gate channels or one or more intersecting gate channel, and the opening at the downstream end of the upstream-stage trap channel and gate channels at a position of the upstream end of the downstream-stage trap channel are connected together.

[2]

The microparticle sorting microchip as described in [1], in which the gate channel includes plural gate channels, and the plural gate channels are connected to the upstream end of the downstream-stage trap channel so that the plural gate channels are symmetrical to each other with respect to a center of a flow of the microparticle-containing fluid from the opening at the downstream end of the upstream-stage trap channel.

[3]

The microparticle sorting microchip as described in [1] or [2], in which the gate channel is configured to allow a gate flow fluid to always flow at a constant flow rate.

[4]

The microparticle sorting microchip as described in claim 3, in which in the downstream-stage trap channel, the gate flow fluid is branched to flow from the gate channel in a direction toward the upstream-stage trap channel and in a direction toward the pressure chamber.

[5]

The microparticle sorting microchip described in any one of [1] to [4], in which the pressure chamber has a vibration plate.

[6]

The microparticle sorting microchip described in any one of [1] to [5], in which the pressure chamber is repeatedly controlled in internal pressure to a negative pressure, a positive pressure, and a normal pressure.

[7]

The microparticle sorting microchip described in any one of [1] to [6], in which the main channel includes a microparticle detection region.

[8]

The microparticle sorting microchip described in any one of [1] to [7], further including:

a connection channel between the trap channel and the pressure chamber.

[9]

The microparticle sorting microchip described in any one of [1] to [8], in which the main channel is connected with a microparticle-containing fluid inlet through which the microparticle-containing fluid is introduced.

[10]

The microparticle sorting microchip described in any one of [1] to [9], in which the main channel is connected with a sheath fluid inlet through which the sheath fluid is introduced.

[11]
The microparticle sorting microchip described in any one of [1] to [10], in which
the main channel is connected with a branch channel which branches upstream of the trap channel and through which a portion of the microparticle-containing fluid which has not flowed into the trap channel is allowed to flow.

[12]
The microparticle sorting microchip described in [11], in which
the branch channel is connected with a sheath fluid container and/or a gate fluid container.

[13]
The microparticle sorting microchip described in any one of [1] to [12], further including:
downstream of the pressure chamber, a microparticle collecting portion for collecting trapped microparticles.

[14]
The microparticle sorting microchip described in any one of [1] to [13], in which
when a microparticle has reached an upstream end of the upstream-stage trap channel, the pressure chamber is changed in internal pressure from a normal pressure to a negative pressure, and the microparticle-containing fluid is drawn into the upstream-stage trap channel and is ejected from an opening at a downstream end of the upstream-stage trap channel into the downstream-stage trap channel to cause a jet, and
after the microparticle has passed through the downstream-stage trap channel and has reached the pressure chamber, the pressure chamber is changed in internal pressure from the negative pressure or the normal pressure to a positive pressure.

[15]
The microparticle sorting microchip described in any one of [1] to [14], in which
the microparticle-containing fluid is ejected from the opening at the downstream end of the upstream-stage trap channel into the second-stage trap channel in a volume that is at least a half of a volume of the upstream-stage trap channel.

[16]
The microparticle sorting microchip described in any one of [1] to [15], in which
when the pressure chamber has been changed in internal pressure from the normal pressure to the negative pressure, the microparticle-containing fluid is ejected from the opening at the downstream end of the upstream-stage trap channel into the downstream-stage trap channel in a volume that is not greater than a volume in which a gate flow fluid flows from the gate channel into the downstream-stage trap channel.

[17]
The microparticle sorting microchip described in any one of [1] to [16], in which
when the pressure chamber has been changed in internal pressure from the normal pressure to the negative pressure, the microparticle-containing fluid is ejected from the downstream-stage trap channel in a direction toward the pressure chamber in a volume that is not greater than a volume of the downstream-stage trap channel.

[18]
A microparticle sorting apparatus including:
a microchip mounting portion configured to mount thereon a microparticle sorting microchip that includes
a main channel through which a microparticle-containing fluid flows,
a trap channel coaxially communicating with the main channel, and
a pressure chamber coaxially communicating with the trap channel,
the trap channel including an upstream-stage trap channel and a downstream-stage trap channel,
the upstream-stage trap channel including at a downstream end thereof an opening that functions as an orifice,
the opening at the downstream end of the upstream-stage trap channel having an area equal to or smaller than a minimum cross-sectional area of the downstream-stage trap channel,
the downstream-stage trap channel including, at an upstream end thereof, one or more connected gate channels or one or more intersecting gate channel, and
the opening at the downstream end of the upstream-stage trap channel and gate channels at a position of the upstream end of the downstream-stage trap channel being connected together;
a light application section that applies light onto a microparticle detection region included in the main channel;
a detection section that detects scattered light and/or fluorescence emitted from the microparticle; and
a pressure chamber control section that changes an internal pressure of the pressure chamber to a negative pressure or a positive pressure.

[19]
The microparticle sorting apparatus described in [18], in which
the pressure chamber control section has a piezo element.

REFERENCE SIGNS LIST

1 First ejection portion
2 Second ejection portion
3 Third ejection portion
7 Opening
10 Gate channel
101 Microparticle-containing fluid inlet
103 Sheath fluid inlet
105 Detection section
107 Branch portion
110 Waste fluid channel
111 Acquisition channel
112 Sheath flow forming portion
113 Trap portion
114, 213 Pressure chamber
211, 303 Trap channel
212 Connection channel
301 Detection channel
305 Vibration plate
306 Piezo element
602 Trap channel diameter
603 Trap channel length

The invention claimed is:
1. A microparticle sorting microchip comprising:
a main channel through which a microparticle-containing fluid flows;
a trap channel and a waste channel which each communicate with the main channel at a branch point, the trap channel coaxially communicating with the main channel;
a trap chamber communicating with the trap channel; and
a gate channel intersecting the trap channel, wherein the trap channel has an opening portion intersecting the gate channel, and a cross-sectional area of the trap channel upstream of the opening portion is smaller than a cross-sectional area of the trap channel downstream of the opening portion, along a direction in which the microparticle-containing fluid flows.

2. The microparticle sorting microchip of claim 1, wherein
the gate channel includes plural gate channels, and the plural gate channels are connected to an upstream end of the downstream-stage trap channel so that the plural gate channels are symmetrical to each other with respect to a center of a flow of the microparticle-containing fluid from an opening at a downstream end of the upstream-stage trap channel.

3. The microparticle sorting microchip of claim 1, wherein
the gate channel is configured to allow a gate flow fluid to always flow at a constant flow rate.

4. The microparticle sorting microchip of claim 3, wherein in the downstream-stage trap channel, the gate flow fluid is branched to flow from the gate channel in a direction toward the upstream-stage trap channel and in a direction toward a pressure chamber.

5. The microparticle sorting microchip of claim 1, wherein
the trap chamber includes a pressure chamber.

6. The microparticle sorting microchip of claim 5, wherein
the pressure chamber has a vibration plate.

7. The microparticle sorting microchip of claim 5, wherein
the pressure chamber is repeatedly controlled in internal pressure to a negative pressure, a positive pressure, and a normal pressure.

8. The microparticle sorting microchip of claim 1, wherein
the main channel includes a microparticle detection region.

9. The microparticle sorting microchip of claim 1, further comprising:
a connection channel between the trap channel and the trap chamber.

10. The microparticle sorting microchip of claim 1, wherein
the main channel is connected with a microparticle-containing fluid inlet through which the microparticle-containing fluid is introduced.

11. The microparticle sorting microchip of claim 1, wherein
the main channel is connected with a sheath fluid inlet through which the sheath fluid is introduced.

12. The microparticle sorting microchip of claim 1, wherein
the main channel is connected with a branch channel which branches upstream of the trap channel and through which a portion of a fluid which has not flowed into the trap channel is allowed to flow.

13. The microparticle sorting microchip of claim 11, wherein
the branch channel is connected with a sheath fluid container and/or a gate fluid container channel.

14. The microparticle sorting microchip of claim 1, further comprising
downstream of the trap chamber, a microparticle collecting portion for collecting trapped microparticles.

15. The microparticle sorting microchip of claim 5, wherein when a microparticle has reached an upstream end of the upstream-stage trap channel, the pressure chamber is changed in internal pressure from a normal pressure to a negative pressure, and the microparticle-containing fluid is drawn into the upstream-stage trap channel and is ejected from an opening at a downstream end of the upstream-stage trap channel into the downstream-stage trap channel to cause a jet, and
after the microparticle has passed through the downstream-stage trap channel and has reached the pressure chamber, the pressure chamber is changed in internal pressure from the negative pressure or the normal pressure to a positive pressure.

16. The microparticle sorting microchip of claim 15, wherein
the microparticle-containing fluid is ejected from the opening at the downstream end of the upstream-stage trap channel into the downstream-stage trap channel in a volume that is at least a half of a volume of the upstream-stage trap channel.

17. The microparticle sorting microchip of claim 15, wherein
when the pressure chamber has been changed in internal pressure from the normal pressure to the negative pressure, the microparticle-containing fluid is ejected from the opening at the downstream end of the upstream-stage trap channel into the downstream-stage trap channel in a volume that is not greater than a volume in which a gate flow fluid flows from the gate channel into the downstream-stage trap channel.

18. The microparticle sorting microchip of claim 15, wherein
when the pressure chamber has been changed in internal pressure from the normal pressure to the negative pressure, the microparticle-containing fluid is ejected from the downstream-stage trap channel in a direction toward the pressure chamber in a volume that is not greater than a volume of the downstream-stage trap channel.

19. A microparticle sorting apparatus comprising:
a microchip mounting portion configured to mount thereon a microparticle sorting microchip according to claim 1;
a light application section that applies light onto a microparticle detection region included in the main channel;
a detection section that detects scattered light and/or fluorescence emitted from the microparticle; and
a pressure chamber control section configured to change an internal pressure of a pressure chamber as the trap chamber to a negative pressure or a positive pressure, wherein the trap chamber includes the pressure chamber.

20. The microparticle sorting apparatus of claim 19, wherein
the pressure chamber control section has a piezo element.

21. The microparticle sorting apparatus of claim 19, wherein
the detection section comprises one or more spots.

22. The microparticle sorting apparatus of claim 19, wherein
the light application section comprises one or more lasers.

23. The microparticle sorting microchip of claim 1, wherein
the gate channel is formed in a direction vertical to a plane of a main channel.

24. The microparticle sorting microchip of claim 1, wherein
a fluid to flow through the gate channel is selected from at least one of a fluid medium used in the microparticle-containing fluid, a sheath fluid, or in a case where the microparticles are a protein, a surfactant-containing, pH-adjusted buffer solution, or a cell culture solution, or a cell storage solution, or blocking agents including solutions containing one or more proteins such as albumin, solutions containing one or more amino acids such as glycine, or solutions containing one or more nonionic surfactants such as Pluronic F68, or a solution having cytolytic activity.

25. The microparticle sorting microchip of claim 1, wherein a length of the trap channel is at least three times a diameter of the trap channel.

26. The microparticle sorting microchip of claim 1, wherein the gate channel includes a plurality of gate channels.

27. The microparticle sorting microchip of claim 26, wherein the gate channels of the plurality of gate channels are disposed symmetrically with respect to a center of the trap channel.

28. The microparticle sorting microchip of claim 1, wherein the gate channel includes an even number of gate channels disposed symmetrically with respect to a center of the trap channel.

29. The microparticle sorting microchip of claim 1, wherein the trap channel is tapered beginning downstream of the gate channel.

30. The microparticle sorting microchip of claim 1, wherein the trap channel includes a first stage trap channel and a second stage trap channel and wherein the second stage trap channel is tapered beginning from an upstream end of a second stage trap channel.

31. The microparticle sorting microchip of claim 1, wherein the trap channel includes a first stage trap channel and a second stage trap channel and wherein the first stage trap channel is tapered.

32. The microparticle sorting microchip of claim 1, wherein the trap channel includes a first stage trap channel and a second stage trap channel and wherein the first stage trap channel and the second stage trap channel are both tapered.

33. The microparticle sorting microchip of claim 32, wherein the second stage trap channel has a greater minimum cross-sectional area than the first stage trap channel.

34. The microparticle sorting microchip of claim 1, wherein the trap channel includes three or more stages.

35. The microparticle sorting microchip of claim 34, wherein a gate channel intersects each of an upstream end of a second stage trap channel and an upstream end of a third stage trap channel.

36. The microparticle sorting microchip of claim 34, wherein a gate channel intersects an upstream end of a second stage trap channel and no gate channel is connected to a third stage trap channel.

37. The microparticle sorting microchip of claim 34, wherein a second stage trap channel and a third stage trap channel are tapered, a gate channel intersects an upstream end of the second stage trap channel, and no gate channel is connected to the third stage trap channel.

* * * * *